(12) United States Patent
Takeuchi

(10) Patent No.: US 12,375,952 B2
(45) Date of Patent: Jul. 29, 2025

(54) RADIO WAVE ANOMALY DETECTION SYSTEM, RADIO WAVE ANOMALY DETECTION METHOD, AND NON-TRANSITORY COMPUTER READABLE MEDIUM STORING RADIO WAVE ANOMALY DETECTION PROGRAM

(71) Applicant: NEC Corporation, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 477 days.

(21) Appl. No.: 17/748,240

(22) Filed: May 19, 2022

(65) Prior Publication Data

US 2022/0386153 A1 Dec. 1, 2022

(30) Foreign Application Priority Data

May 28, 2021 (JP) .................................. 2021-090593

(51) Int. Cl.
| | | |
|---|---|---|
| H04B 15/02 | (2006.01) | |
| H04B 1/10 | (2006.01) | |
| H04B 17/345 | (2015.01) | |
| H04W 24/08 | (2009.01) | |
| H04K 3/00 | (2006.01) | |

(52) U.S. Cl.
CPC .......... *H04W 24/08* (2013.01); *H04B 1/1027* (2013.01); *H04B 17/345* (2015.01); *H04K 3/22* (2013.01)

(58) Field of Classification Search
CPC ............. H04W 24/08; H04W 52/0238; H04W 52/243; H04W 72/541; H04B 1/1027; H04B 17/345; H04B 1/0475; H04B 1/10; H04B 15/02; H04B 17/15; H04K 3/22; Y02D 30/70
See application file for complete search history.

(56) References Cited

U.S. PATENT DOCUMENTS

| | | | | |
|---|---|---|---|---|
| 10,313,212 | B2 * | 6/2019 | Mota | H04W 4/046 |
| 11,599,815 | B1 * | 3/2023 | Mani | G06N 20/00 |
| 11,829,868 | B2 * | 11/2023 | Ikeda | G06F 17/16 |
| 2019/0057197 | A1 * | 2/2019 | Wang | G06F 16/958 |
| 2019/0391574 | A1 * | 12/2019 | Cheng | G06N 3/044 |
| 2022/0180179 | A1 * | 6/2022 | Gusat | G06F 16/22 |
| 2023/0231861 | A1 * | 7/2023 | Chen | H04L 63/102 |
| | | | | 726/26 |
| 2023/0269258 | A1 * | 8/2023 | Ushio | H04L 67/12 |
| | | | | 726/22 |
| 2024/0185089 | A1 * | 6/2024 | Srinivasan | G06N 20/00 |

FOREIGN PATENT DOCUMENTS

| | | |
|---|---|---|
| JP | 2013-074305 A | 4/2013 |
| JP | 2020-141330 A | 9/2020 |
| JP | 2020-141395 A | 9/2020 |

OTHER PUBLICATIONS

JP Office Action for JP Application No. 2021-090593, mailed on Feb. 25, 2025 with English Translation.

* cited by examiner

*Primary Examiner* — Andrew Wendell

(57) ABSTRACT

A radio wave anomaly detection system outputs a detection result about a radio wave anomaly that is included in received data and has been detected using a first feature that is a feature extracted from the received data every first predetermined time period, and a second feature that is a feature extracted from the received data every second predetermined time period longer than the first predetermined time period.

17 Claims, 27 Drawing Sheets

RADIO WAVE ANOMALY DETECTION SYSTEM, RADIO WAVE ANOMALY DETECTION METHOD, AND NON-TRANSITORY COMPUTER READABLE MEDIUM STORING RADIO WAVE ANOMALY DETECTION PROGRAM

INCORPORATION BY REFERENCE

This application is based upon and claims the benefit of priority from Japanese patent application No. 2021-90593, filed on May 28, 2021, the disclosure of which is incorporated herein in its entirety by reference.

TECHNICAL FIELD

The present disclosure relates to a radio wave anomaly detection system, a radio wave anomaly detection method, and a non-transitory computer readable medium storing a radio wave anomaly detection program.

BACKGROUND ART

Wireless communication using radio waves have been utilized in various fields. In such communication, communication regarded to be important, such as of police radio, fire radio, aeronautical radio, and train radio, is called important wireless communication. In case jamming occurs for the important wireless communication, situations fatal to humans possibly develop. Accordingly, it is significantly important to detect (monitor) radio interference and failure in emission situations of radio waves used for such communication.

In recent years, the private LTE (Long Term Evolution), the local 5G and the like developed from 4G/5G (4th/5th Generation Mobile Communication System), which are communication standards for mobile phones, as types of private radio waves, have been attracting the attention. With the local 5G and the like, license issuance, and wireless communication system construction will possibly be executed for each of self-employment areas and business entities. Accordingly, similar to the important wireless communication described above, prevention of the degradation of radio performance of the system, and analysis of the cause of degradation are expected to be improved by automatically detecting (monitoring) radio interference from adjacent areas and the like to a wireless communication system, such as of the local 5G, and failure and the like in the own system. Here, the failure includes radio wave failure, and breakdown and failure of the system and equipment (hereinafter, simply called failure).

Typically, to detect radio interference and failure for a radio wave emission situation and the wireless communication system, a method is conceivable that sets a threshold for a certain radio wave reception level, and determines radio waves having a reception level exceeding the threshold to be abnormal. The threshold for the reception level defined for each frequency of radio waves is called a spectrum mask. Among such cases, only a case where the reception level exceeds the value of the spectrum mask is determined to be abnormal. Accordingly, there is a problem in that a case where the reception level is low, and a case where a feature other than the reception level causes an anomaly are not determined to be abnormal.

A method of identifying an anomaly and a failure factor is disclosed also in Japanese Unexamined Patent Application No. 2013-74305, for example.

Japanese Unexamined Patent Application No. 2013-74305 proposes a technique that extracts the amplitude feature every predetermined time point from received sampled data, and calculates the similarity between the extracted amplitude feature and multiple training data items, thereby determining presence or absence of occurrence of radio interference, and its factor.

According to Japanese Unexamined Patent Application No. 2013-74305, the amplitude feature is extracted every predetermined time point. Accordingly, there is a problem in that occurrence of radio interference having a period exceeding the predetermined time point cannot be detected. That is, Japanese Unexamined Patent Application No. 2013-74305 has a problem in that a radio wave anomaly included in the received data cannot accurately detected.

SUMMARY

One of objects of the present disclosure is to provide a radio wave anomaly detection system, a radio wave anomaly detection method, and a radio wave anomaly detection program that solve the problems described above.

According to one example embodiment, a radio wave anomaly detection system outputs a detection result about a radio wave anomaly that is included in received data and has been detected using a first feature that is a feature extracted from the received data every first predetermined time period, and a second feature that is a feature extracted from the received data every second predetermined time period longer than the first predetermined time period.

According to one example embodiment, a radio wave anomaly detection method includes: a first feature extraction step of extracting a feature in received data in every first predetermined time period, as a first feature; a second feature extraction step of extracting a feature in the received data in every second predetermined time period longer than the first predetermined time period, as a second feature; and an anomaly detection step of detecting a radio wave anomaly included in the received data, using the first feature and the second feature. According to one example embodiment, a radio wave anomaly detection program causes a computer to execute a first feature extraction process of extracting a feature in received data in every first predetermined time period, as a first feature; a second feature extraction process of extracting a feature in the received data in every second predetermined time period longer than the first predetermined time period, as a second feature; and an anomaly detection process of detecting a radio wave anomaly included in the received data, using the first feature and the second feature.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENTS

Figure 1:
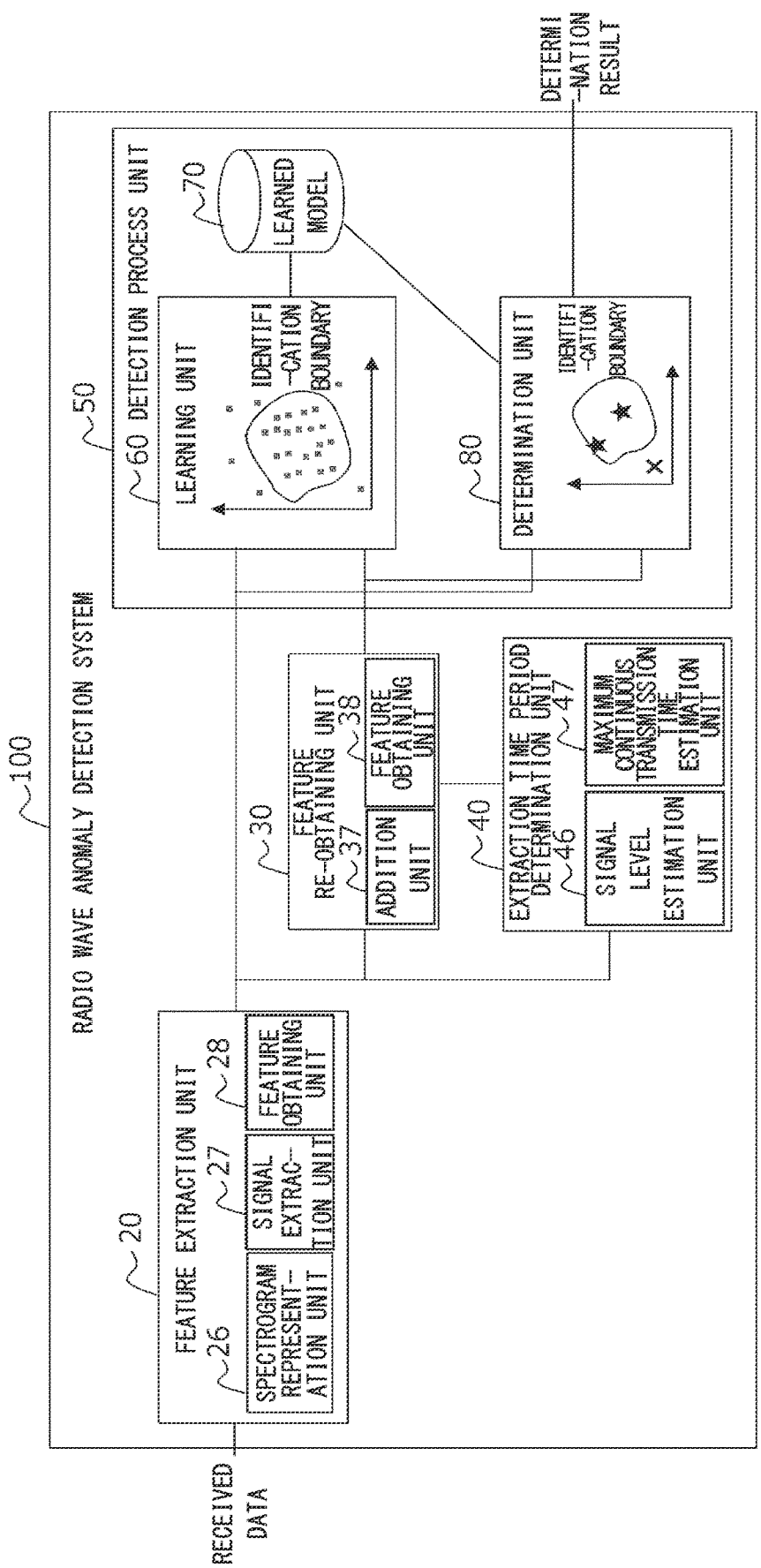
FIG. 1 is a block diagram showing an example of an overall configuration of a radio wave anomaly detection system according to a first example embodiment.

Hereinafter, referring to the drawings, example embodiments are described. Note that the drawings are simplified ones. Accordingly, the technical scope of the example embodiments should not be narrowly construed based on the illustration of the drawings. The same elements are assigned the same symbols, and redundant description is omitted.

In the following example embodiments, description is made in a manner of being divided into multiple sections or example embodiments when necessary for convenience. However, unless specifically stated, these are not irrelevant from each other, and there is a relationship where one is a modification example, an applied example, detailed description, supplementary description and the like of part or all the parts of another. In the following example embodiments, in a case where the number of elements and the like (including the number, numerical value, quantity, range and the like) is stated, unless specifically stated or with a limitation clearly to a specific number in principle, there is no limitation to the specific number, and any of numbers more or less than the specific number may be adopted.

Furthermore, in the following example embodiments, the configuration elements (including operation steps etc.) are not necessary, unless specifically stated or conceived to be clearly necessary in principle. Likewise, in the following example embodiments, in a case where the shapes, positional relationships and the like of configuration elements and the like are described, it is assumed that what are substantially resembled or similar to the shapes and the like are encompassed, unless specifically stated or construed to be clearly inapplicable in principle. This also applies to the number and the like (including the number, numerical value, quantity, range and the like).

OVERVIEW OF EXAMPLE EMBODIMENT

Hereinafter, referring to FIGS. 1 to 18, details of radio wave anomaly detection systems according to first to third example embodiments are described.

First, in the first example embodiment, the basic configurations, characteristics, and operations of a first feature extraction unit of extracting a first feature that is a short-term feature, a second feature extraction unit of extracting a second feature that is a long-term feature by re-obtaining a feature using a plurality of the first features extracted by the first feature extraction unit, an extraction time period determination unit of determining the extraction time period of the second feature by the second feature extraction unit, and a detection process unit of learning a model representing presence or absence of a radio wave anomaly in received data, and determining presence or absence of a radio wave anomaly in the received data using the first features and the second features, are described in detail, these units being provided for a radio wave anomaly detection system. Note that the details of the features are described later.

In the second example embodiment, an example is described where a detection process unit provided for the radio wave anomaly detection system includes: a function of learning and determining, using the first features (short-term features) extracted by the first feature extraction unit; and a function of learning and determining, using the second features (long-term features) extracted by the second feature extraction unit.

Furthermore, in the third example embodiment, an example is described where a detection process unit provided for the radio wave anomaly detection system determines presence or absence of a radio wave anomaly by comparison between the maximum continuous transmission time determined at the time of learning, and the transmission duration time of a transmitted signal included in received data, instead of determining presence or absence of a radio wave anomaly using a learned model, in a detection determination using the second feature (long-term feature). Here, the transmitted signal included in the received data is, for example, a signal transmitted from a wireless device or a radio interference source other than a receiver.

First Example Embodiment

Figure 2:
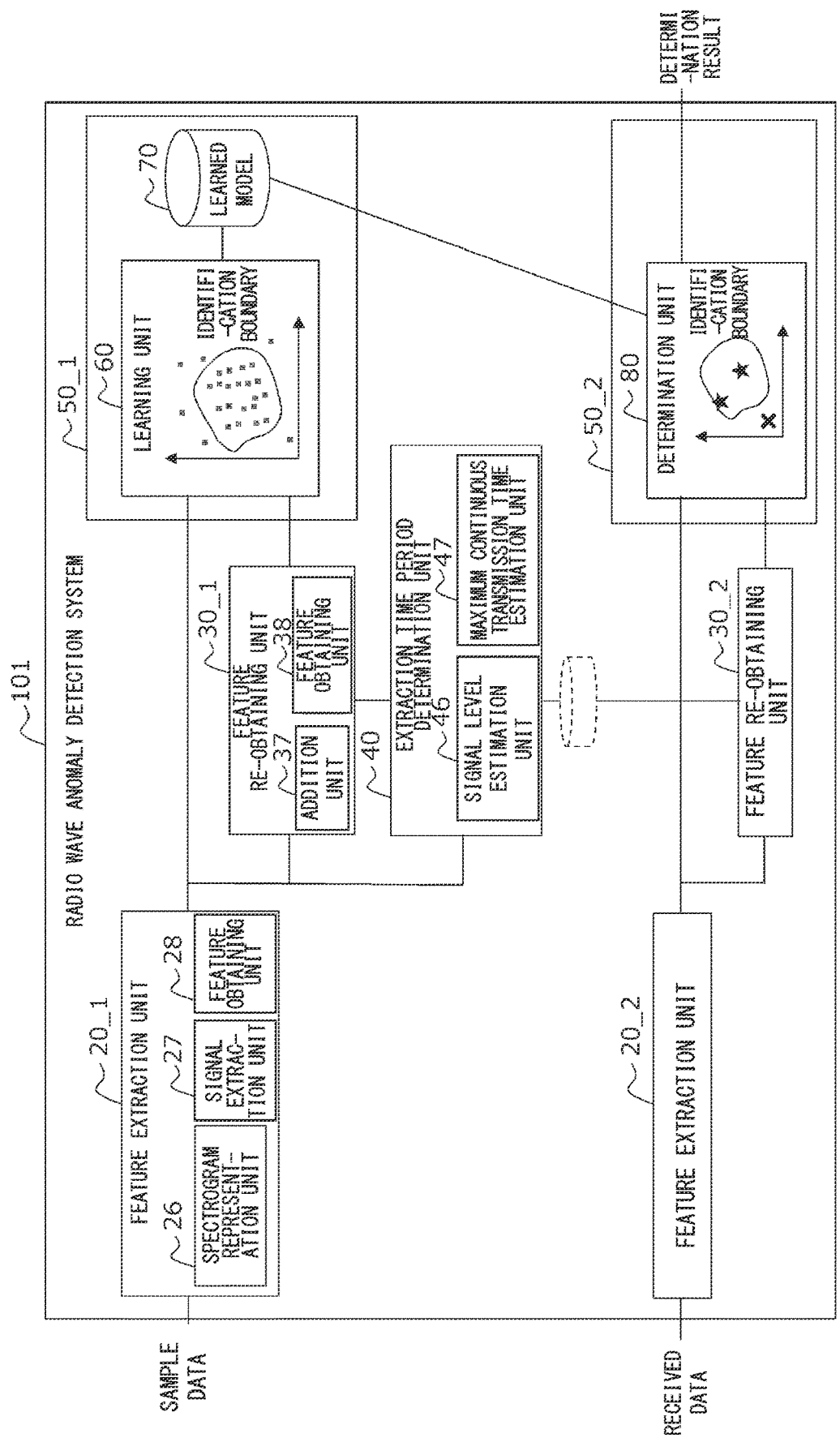
FIG. 2 is a block diagram showing a first modification example of a radio wave anomaly detection system according to the first example embodiment.

FIG. 1 is a block diagram showing an example of an overall configuration of a radio wave anomaly detection system 100 according to the first example embodiment. FIG. 2 is a block diagram showing a modification example of the radio wave anomaly detection system 100 as a radio wave anomaly detection system 101. In FIG. 1, part of each of processes that are a learning process and a determination process is achieved using a common processing circuit.

Meanwhile, in FIG. 2, the learning process and the determination process are achieved using processing circuits different from each other. Any of the configurations shown in FIGS. 1 and 2 is capable of exerting equivalent advantageous effects. Accordingly, hereinafter, the configuration shown in FIG. 1 is mainly described.

The radio wave anomaly detection system 100 includes, for example: at least a feature extraction unit (first feature extraction unit) 20 of extracting a first feature that is a short-term feature; a feature re-obtaining unit (second feature extraction unit) 30 of extracting a second feature that is a long-term feature achieved by re-obtaining a feature using a plurality of the first features extracted by the feature extraction unit 20; an extraction time period determination unit 40 of determining the extraction time period of the second feature by the feature re-obtaining unit 30; and a detection process unit (anomaly detection unit) 50 of learning a model representing presence or absence of a radio wave anomaly in received data, and determining presence or absence of a radio wave anomaly in the received data using the first feature and the second feature.

The feature extraction unit 20 includes at least a spectrogram representation unit 26, a signal extraction unit 27, and a feature obtaining unit 28. The spectrogram representation unit 26 performs at least any of spectrum representation and spectrogram representation, from the received data. The signal extraction unit 27 extracts a signal area of a transmitted signal included in the received data, and the reception level of the transmitted signal, using a threshold of noise level or the like, from a spectrogram and the like output from the spectrogram representation unit 26. The feature obtaining unit 28 obtains the feature in every short-term extraction time period (predetermined time period) T1, using an extraction result of the signal extraction unit 27. Accordingly, the feature extraction unit 20 extracts a plurality of first features that are short-term features in the respective short-term extraction time periods T1.

The feature re-obtaining unit 30 includes a feature addition unit 37, and a feature obtaining unit 38. The feature addition unit 37 adds (totalizes) the plurality of first features in a long-term extraction time period (predetermined time period) T2. The feature obtaining unit 38 re-obtains a feature using the addition result of the plurality of first features every long-term extraction time period T2.

The extraction time period determination unit 40 includes a signal level estimation unit 46, and a maximum continuous transmission time estimation unit 47. The signal level estimation unit 46 estimates (sets) the signal level (the reception level exceeding a reception level estimated to have a noise floor level among the reception levels of the received data) of the transmitted signal included in the received data, using the plurality of first features extracted by the feature extraction unit 20. The maximum continuous transmission time estimation unit 47 estimates the maximum continuous transmission time (the maximum value of times in which the signal level is maintained), using the signal level estimated by the signal level estimation unit 46, and the plurality of first features extracted by the feature extraction unit 20. Note that the long-term extraction time period T2 is determined from the estimated maximum continuous transmission time, and is output to the feature re-obtaining unit 30.

The detection process unit 50 includes a learning unit 60, a database 70, and a determination unit 80. The learning unit 60 performs machine learning of a model representing whether the received data includes a radio wave anomaly (radio interference and failure) or not, using a first feature (first sample feature) and a second feature (second sample feature) extracted from sample data, in the learning process. The database 70 stores a learned model (hereinafter, also called a learned model 70) generated by the machine learning by the learning unit 60. In the determination process, the determination unit 80 determines whether the received data includes a radio wave anomaly or not, using the first features output from the feature extraction unit 20, the second features output from the feature re-obtaining unit 30, and the learned model 70. Note that the time of the learning process indicates a step of preliminarily performing machine learning of a model representing whether subsequent actual received data includes a radio wave anomaly or not using sample data. The time of the determination process indicates a step of determining whether the received data includes a radio wave anomaly or not using actual received data.

Note that the feature is statistical information including information about the received data on both the frequency direction and the time direction in the predetermined extraction time period. For example, the feature is assumed as a statistical feature extracted every predetermined time period, such as a frequency distribution (histogram), a probability density function (PDF), a cumulative distribution function (CDF), or an amplitude probability density (APD). Note that the feature may be directly extracted from received data on a time axis. Alternatively, the data may be converted into data on a frequency axis through spectrum representation or spectrogram representation, and then the feature may be extracted on a frequency-by-frequency basis.

Note that in comparison with the radio wave anomaly detection system 100 shown in FIG. 1, the radio wave anomaly detection system 101 shown in FIG. 2 individually includes: a feature extraction unit 20_1 for the learning process, and a feature extraction unit 20_2 for the determination process, instead of the feature extraction unit 20; and individually includes a feature re-obtaining unit 30_1 for the learning process, and a feature re-obtaining unit 30_2 for the determination process, instead of the feature re-obtaining unit 30. Each of the feature extraction units 20_1 and 20_2 has the same function as the feature extraction unit 20. Each of the feature re-obtaining units 30_1 and 30_2 has the same function as the feature re-obtaining unit 30. In comparison with the radio wave anomaly detection system 100 shown in FIG. 1, the radio wave anomaly detection system 101 shown in FIG. 2 includes a detection process unit 50_1 for the learning process, and a detection process unit 50_2 for the determination process, instead of the detection process unit 50. The detection process unit 50_1 includes a learning unit 60 and a database 70. The detection process unit 50_2 includes a determination unit 80. The other configuration and operation of the radio wave anomaly detection system 101 are similar to those of the radio wave anomaly detection system 100. Accordingly, the description is omitted. Note that the database 70 may be provided in the detection process unit 50_2, or independently provided.

(Operation of Radio Wave Anomaly Detection System 100)

Subsequently, the operation of the radio wave anomaly detection system 100 according to the first embodiment is described.

Figure 3:
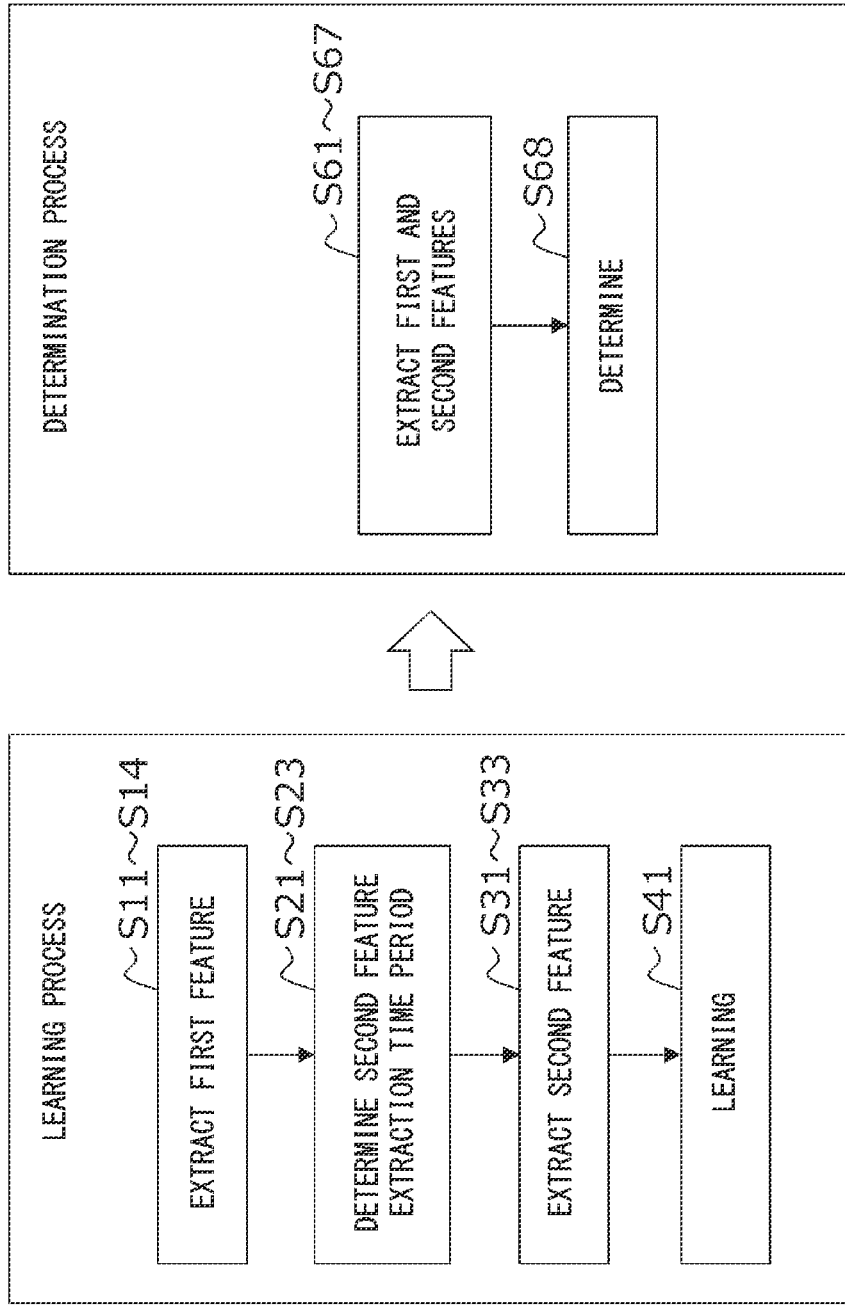
FIG. 3 is a flowchart showing an overview of a flow of overall processes through the radio wave anomaly detection system according to the first example embodiment.

FIG. 3 is a flowchart showing an overview of a flow of overall processes through the radio wave anomaly detection system 100.

As shown in FIG. 3, the processes by the radio wave anomaly detection system 100 are classified into steps of learning processes to be preliminarily or periodically performed, and steps of determination processes to be sequentially performed during operation. The learning process mainly includes: processes of extracting a first feature that is a short-term feature (steps S11 to S14); processes of determining an extraction time period for extracting a second feature that is a long-term feature (steps S21 to S23); processes of extracting (re-obtaining) a second feature (steps S31 to S33); and a learning process (step S41). The determination process mainly includes a process of sequentially extracting the first features and the second features (steps S61 to S67); and a process of determining whether the received data includes a radio wave anomaly or not using the extracted first and second features, and the learned model (step S68).

(Details of Learning Processes by Radio Wave Anomaly Detection System 100)

Figure 4A:
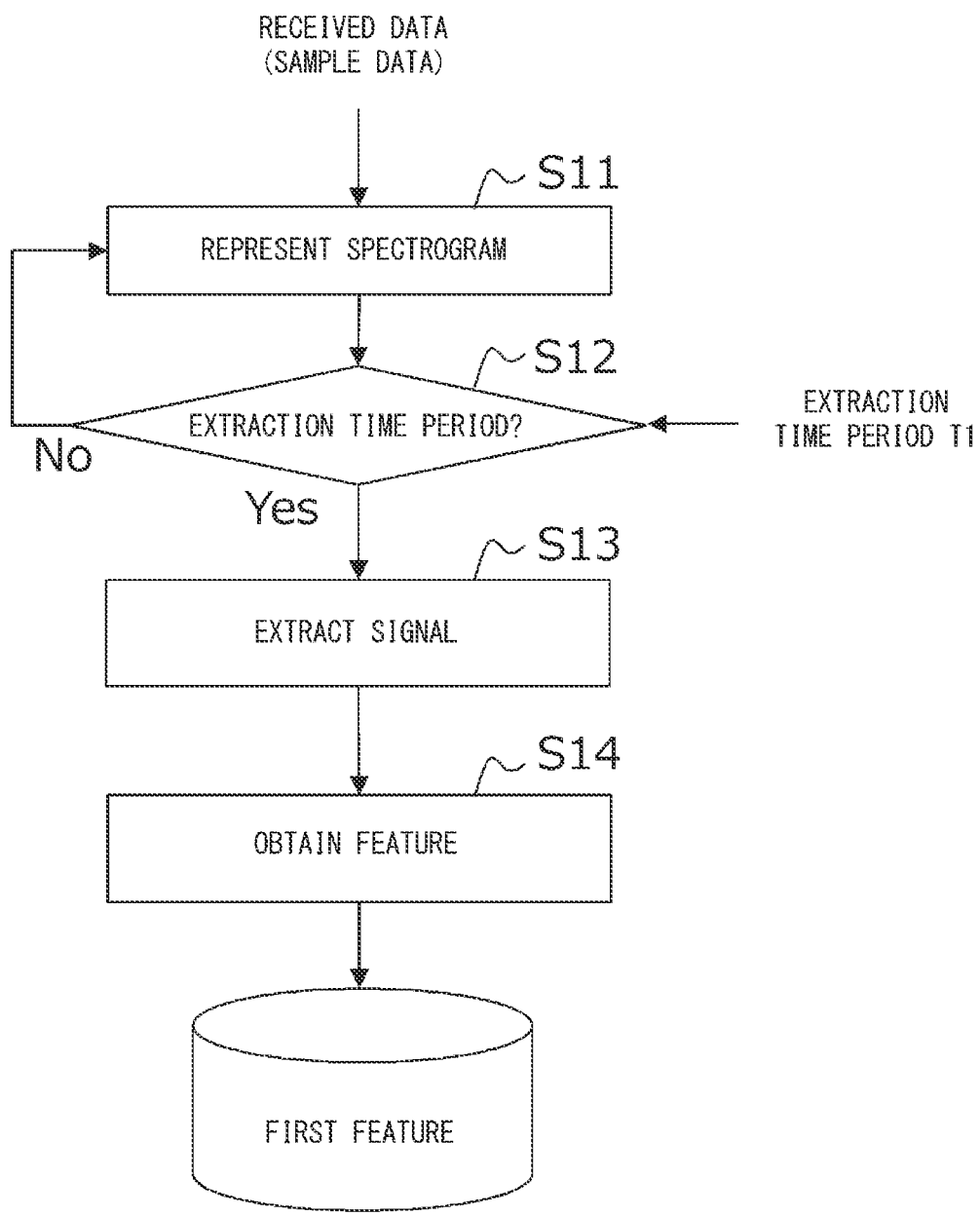
FIG. 4A is a flowchart showing a flow of a learning process through the radio wave anomaly detection system according to the first example embodiment.
Figure 4B:
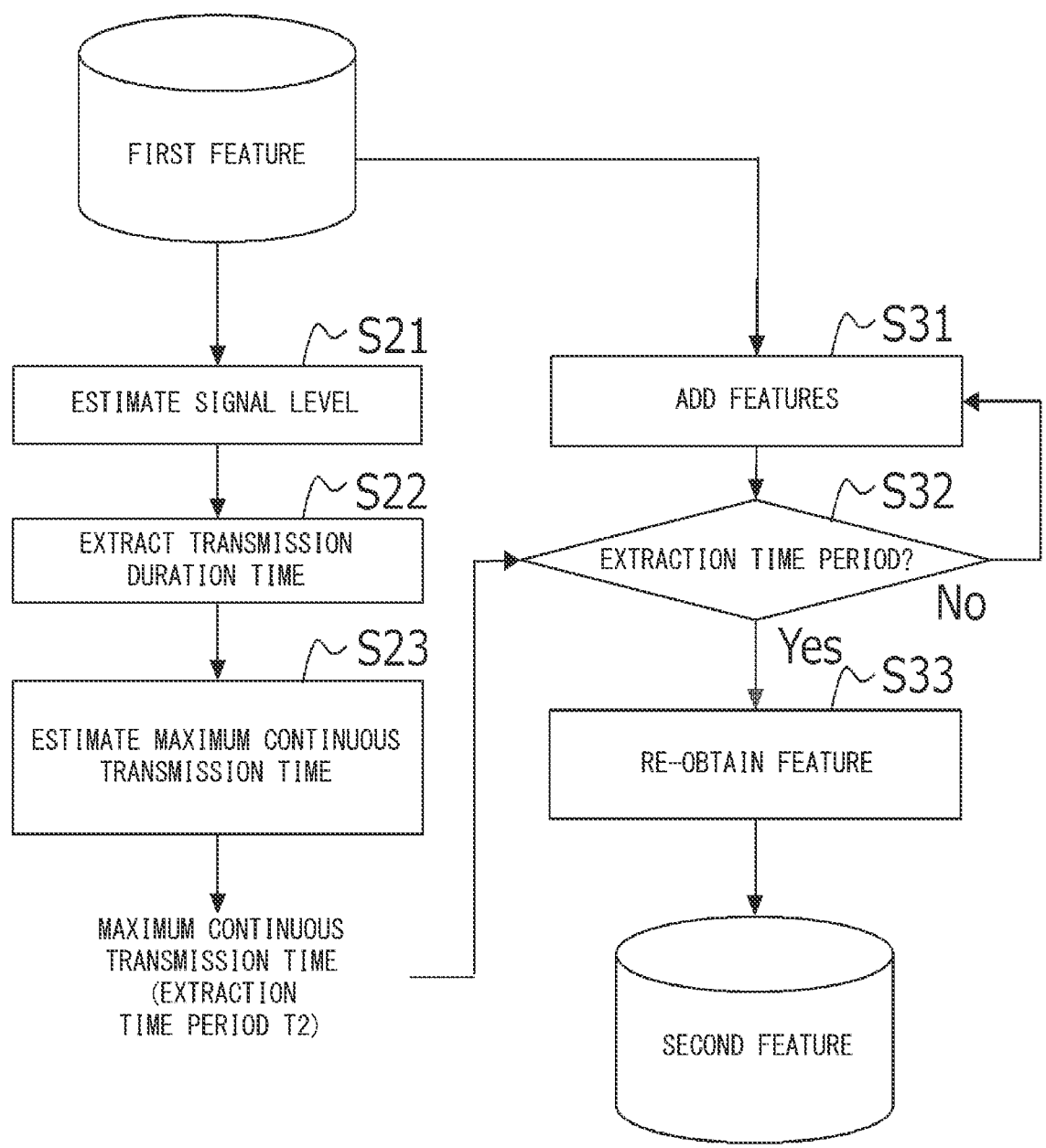
FIG. 4B is a flowchart showing a flow of the learning process through the radio wave anomaly detection system according to the first example embodiment.
Figure 4C:
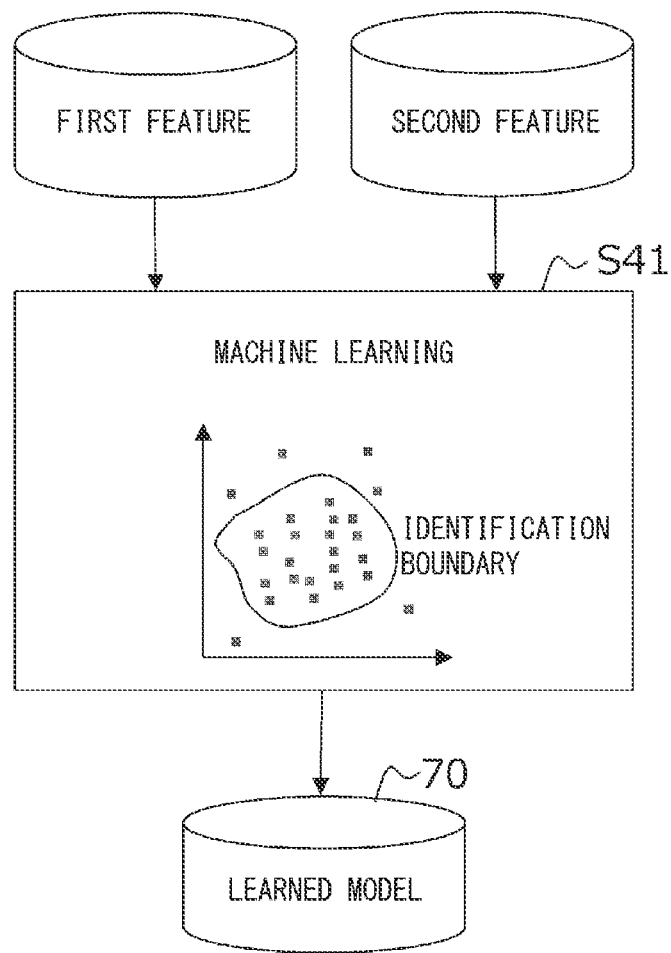
FIG. 4C is a flowchart showing a flow of the learning process through the radio wave anomaly detection system according to the first example embodiment.

FIGS. 4A to 4C are flowcharts showing flows of the learning processes through the radio wave anomaly detection system 100 according to the first example embodiment.

It is assumed that the learning processes shown in FIGS. 4A to 4C collect received data in a normal state (at the normal time), as sample data. The time period of collecting the received data to be used for leaning (sample data) is only required to substantially include communication situations that are assumed in the normal state (at the normal time). Accordingly, data in several seconds to several tens of seconds in any one day, and data in several tens of seconds or several hours in total extracted randomly in several days or a week, or every constant hours may be adopted with no problem.

First, among the learning processes, a process of extracting the first feature (first sample feature), which is a short-term feature, in the feature extraction unit 20 (steps S11 to S14) is described.

First, the spectrogram representation unit 26 achieves spectrum representation or spectrogram representation of received data collected for learning, and converts the data into data indicating the reception level on a time-by-time or frequency-by-frequency basis (step S11). Subsequently, every extraction time period T1 (e.g., 5 ms) determined based on the wireless standard, the multiplexing period and the like of the wireless communication system to be monitored (step S12), the feature obtaining unit 28 extracts the first feature, which is a short-term feature, from the data converted by the spectrogram representation unit 26 (step S13→S14). Note that at this time, to monitor the state of radio waves in terms of signal level instead of noise level, and to detect interference and failure in terms of signal level, signals less than the noise floor may be degenerated to a certain level by the signal extraction unit 27, and the signal level may be extracted (step S13), and passed to the feature obtaining unit 28. Note that some of the signals at the noise floor level (noise) are not degenerated to the certain level, and are intentionally extracted. Subsequently, the feature obtaining unit 28 extracts, as the first feature, a statistical feature, such as the frequency distribution (histogram), probability density function (PDF), cumulative distribution function (CDF), or amplitude probability density (APD), for the reception level, every predetermined extraction time period T1 (step S14).

Next, among the learning processes, a process of determining the extraction time period T2 of the second feature (second sample feature) that is a long-term feature, in the extraction time period determination unit 40 (steps S21 to S23) is described.

First, the signal level estimation unit 46 estimates the signal level (noise floor level) using the first feature, which is the short-term feature extracted every extraction time period T1 by the feature extraction unit 20 (step S21). The maximum continuous transmission time estimation unit 47 sequentially extracts the transmission duration time (time in which the signal level is maintained) of the transmitted signal included in the received data, based on a plurality of the extracted first features and information on the estimated signal level (step S22). Subsequently, the maximum continuous transmission time estimation unit 47 estimates the maximum continuous transmission time based on the distribution and the like of the extracted individual transmission duration times (step S23), and determines the extraction time period T2 in conformity with the maximum continuous transmission time. Note that the details of the operation of the extraction time period determination unit 40 is described later.

Next, among the learning processes, a process of extracting the second feature (second sample feature) that is a long-term feature, in the feature re-obtaining unit 30 (steps S31 to S33) is described.

First, the feature addition unit 37 adds (totalizes) the plurality of first features in every long-term extraction time period T2 (step S31→S32). Subsequently, the feature obtaining unit 38 extracts (re-obtains) the addition result of the plurality of first features in every long-term extraction time period T2, as the second feature (step S33).

Lastly, among the learning processes, a machine learning process (step S41) is described.

The learning unit 60 performs machine learning of a model representing whether the received data includes a radio wave anomaly (radio interference and failure) or not using high-dimensional (multi-dimensional) feature vectors formed by linking the first features and the second features (step S41).

This example embodiment assumes a case where the machine learning adopted by the learning unit 60 is unsupervised learning in order to detect unknown interference and failure that are difficult to be preliminarily defined as training data, and assumes a case of one-class SVM (One-class Support Vector Machine), for example. Note that the machine learning adopted by the learning unit 60 is not limited to one-class SVM. For example, machine learning of a model, such as an anomaly detection model using deep learning (Deep Anomaly Detection), may be adopted. Alternatively, the machine learning adopted by the learning unit 60 may use a method of learning a threshold for statistically detecting an anomaly using the Mahalanobis distance, variance (standard deviation) and the like, from the distribution of the high-dimensional (multi-dimensional) feature vectors as described above, and a method of predicting the change tendency using a state filter, such as a Kalman filter and a particle filter, and detecting whether to deviate from the change tendency or not, with no problem. Furthermore, the machine learning adopted by the learning unit 60 is not limited to the unsupervised learning, and may be supervised learning instead. Note that according to the unsupervised learning, machine learning is performed with no output (correct answer) to an input being given. Meanwhile, according to the supervised learning, machine learning is performed with an output (correct answer) to an input being given.

The learned model generated by the machine learning by the learning unit 60, the threshold for detecting an anomaly, the coefficient indicating the change tendency and the like are stored in the database 70.

(Details of Determination Process by Radio Wave Anomaly Detection System 100)

Figure 5:
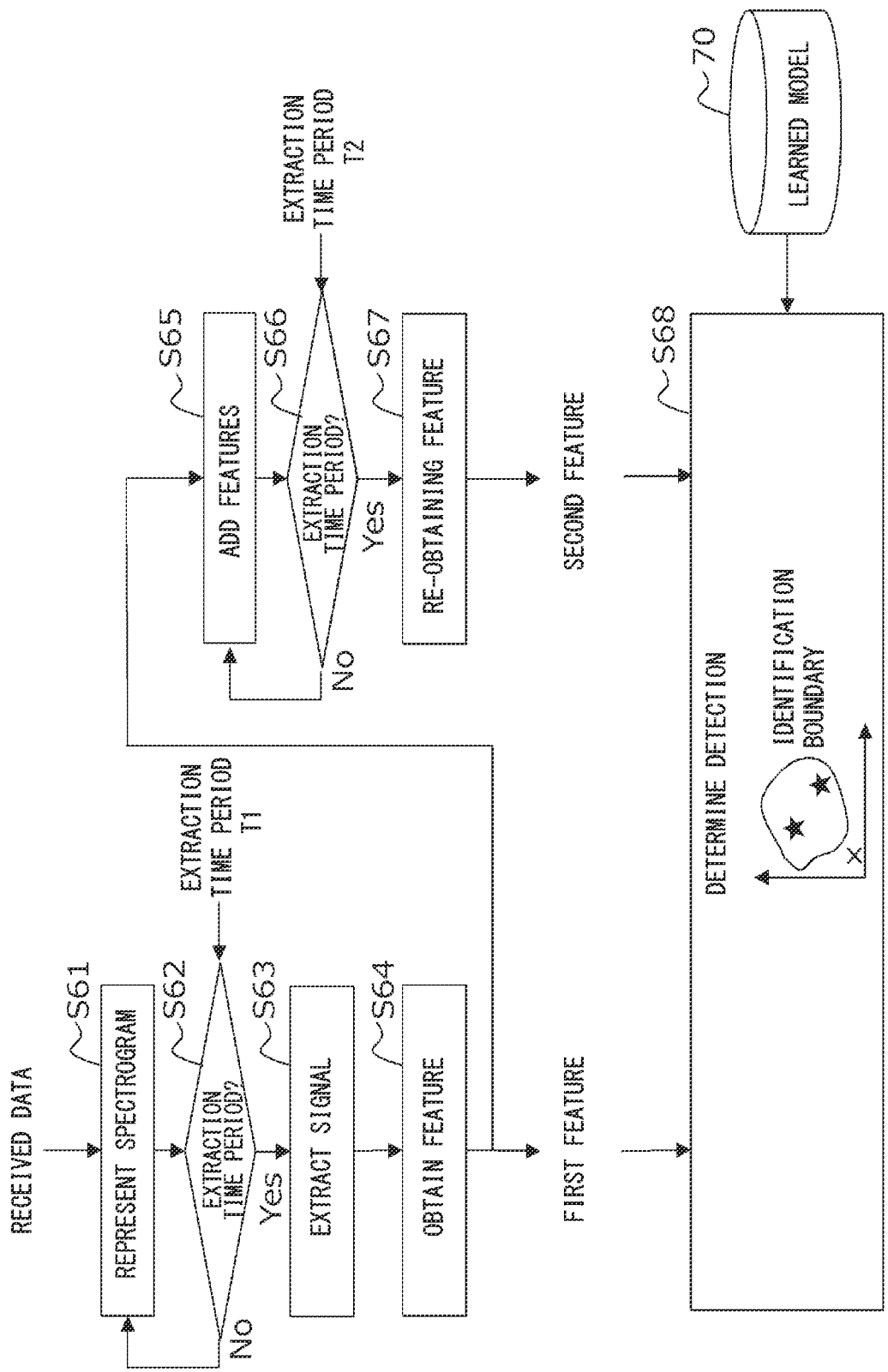
FIG. 5 is a flowchart showing a flow of a determination process through the radio wave anomaly detection system according to the first example embodiment.

FIG. 5 is a flowchart showing a flow of a determination process through the radio wave anomaly detection system 100 according to the first example embodiment.

The determination process shown in FIG. 5 is a process of obtaining received data from a radio wave environment to be monitored at the time of actual operation, and sequentially performing the detection determination of radio interference and failure.

First, similar to the learning process, the determination process performs a process of extracting the first feature, which is a short-term feature, and the second feature, which is the long-term feature, using the feature extraction unit 20 and the feature re-obtaining unit 30 (S61 to S67). The processes of extracting the first feature and the second feature in the determination process are similar to the processes of extracting the first feature (first sample feature) and the second feature (second sample feature) in the learning process. Accordingly, the description is omitted.

Note that the short-term extraction time period T1 and the long-term extraction time period T2, which have the same values as those in the learning process, are used for the short-term extraction time period, and the long-term extraction time period in the determination process. Specifically, the values of the extraction time period set based on the wireless standard and the multiplexing period of the wireless communication system to be monitored are used as the short-term extraction time period in the determination process. The value of extraction time period determined by the process by the extraction time period determination unit 40 in the learning process is used as the long-term extraction time period in the determination process.

Next, among the determination processes, a detection determination process (step S68) is described.

The determination unit 80 performs the detection determination process, using the first features and the second features sequentially extracted from the received data, and the learned model 70 generated by the machine learning in the learning process (step S68).

For example, in a case where the learned model 70 has been generated by machine learning, such as one-class SVM, which is a type of unsupervised learning, the determination unit 80 receives the high-dimensional (multi-dimensional) feature vectors formed by linking the first features and the second features, then converts the positional relationship and the distances of the feature vectors for an identification boundary constructed in the learned model 70, into normality (or abnormality), and outputs this. The determination unit 80 then outputs a determination result of whether the received data includes a radio wave anomaly or not, based on the calculation result.

Note that in cases of statistically detecting an anomaly using the Mahalanobis distance, variance (standard deviation) and the like, the determination unit 80 may calculate the distances of the feature vectors from a learned threshold having been learned in the learning process, and output the distances as a determination result. Alternatively, in cases of predicting the change tendency using a state filter, such as a Kalman filter or a particle filter, the determination unit 80 may calculate the deviation degrees of the feature vectors from a coefficient indicating the change tendency, and output the degrees as a determination result.

(Details of Operations of Feature Extraction Unit 20, Feature Re-Obtaining Unit 30, and Extraction Time Period Determination Unit 40)

Subsequently, the details of operations of the feature extraction unit 20, the feature re-obtaining unit 30 and the extraction time period determination unit 40 are described.

FIGS. 6A to 6D are schematic diagrams showing examples of statistical features extracted from received data by the radio wave anomaly detection system 100. As already described, in this example embodiment, the feature extraction unit 20 extracts the first feature every short-term extraction time period T1, and the feature re-obtaining unit 30 extracts the second feature every long-term extraction time period T2.

First, in the feature extraction unit 20, the spectrogram representation unit 26 converts received data, such as a time-axis IQ signal, into a signal on each frequency through FFT (fast Fourier transform) or the like (step S11). Subsequently, every extraction time period T1 (step S12), the signal extraction unit 27 extracts the signal level on each frequency based on the noise floor threshold, from the data obtained through the conversion by the spectrogram representation unit 26 (step S13). Subsequently, the feature obtaining unit 28 extracts the first feature from the signal level on each frequency extracted by the signal extraction unit 27 (step S14).

Figure 6A:
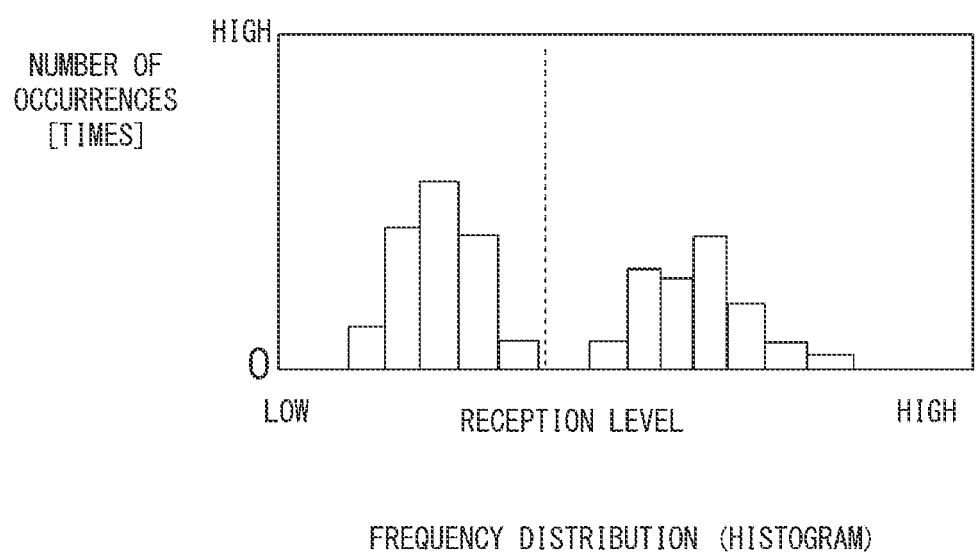
FIG. 6A is a schematic diagram showing an example of a statistical feature.
Figure 6B:
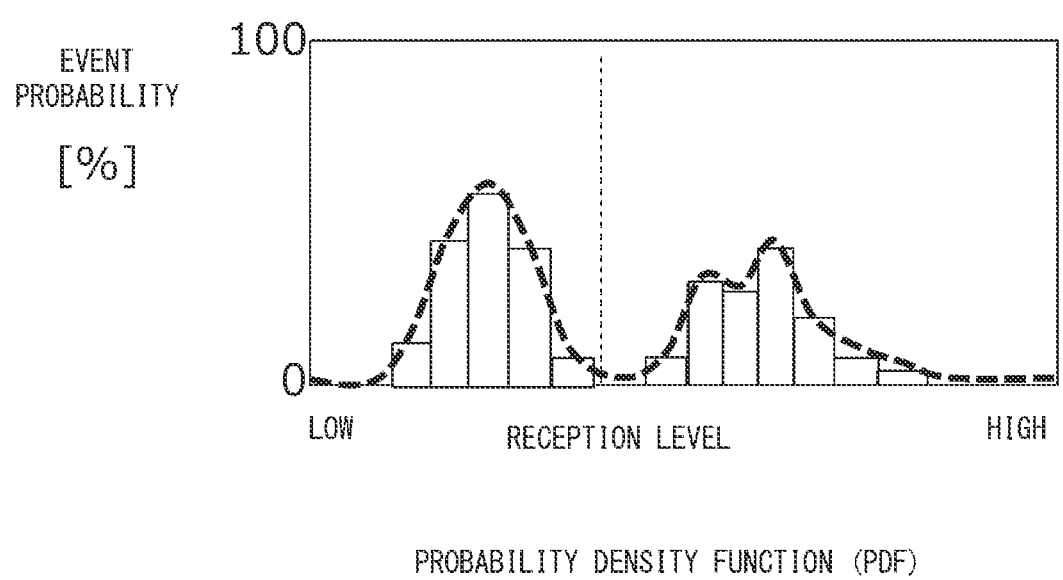
FIG. 6B is a schematic diagram showing an example of the statistical feature.
Figure 6C:
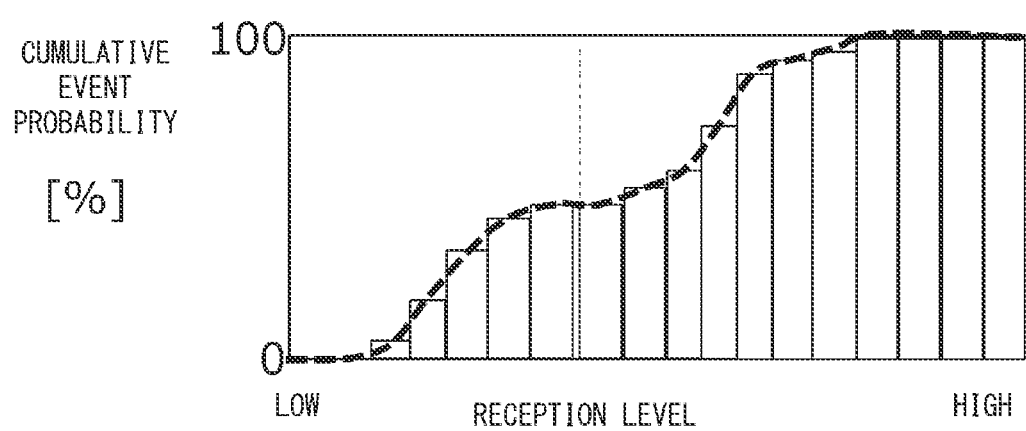
FIG. 6C is a schematic diagram showing an example of the statistical feature.
Figure 6D:
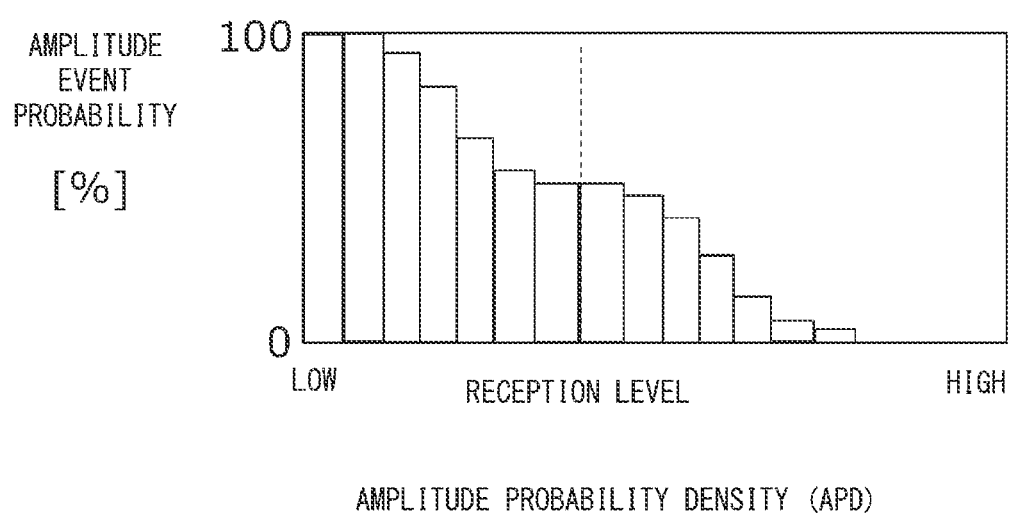
FIG. 6D is a schematic diagram showing an example of the statistical feature.

Here, as shown in FIG. 6A, the features (including both the first and second features) may be the frequency distribution (histogram) at each reception level extracted every extraction time period. Alternatively, as shown in FIG. 6B, the features may be a probability density function (PDF) obtained by using, as functions, the unit of frequencies that is the probability density instead of the absolute value of the frequency. Note that when the PDF is used as the feature, the feature is not the probability density function itself, but is a discrete value obtained by integration on each constant reception level, and is substantially identical to a value obtained by normalizing the frequency distribution as the probability density. Alternatively, for example, as shown in FIGS. 6C and 6D, the feature may be a cumulative distribution function (CDF) that is a cumulative probabilities of the frequency distribution in FIG. 6A, or an amplitude probability density (APD). The CDF indicates probabilities of occurrence of signals having the reception level or lower at each reception level. The APD indicates probabilities of occurrence of signals having the reception level or higher at each reception level. Note that when the CDF is used as the feature, the feature is not the distribution function itself, but is a discrete value obtained by integration on each constant reception level. That is, the feature is substantially identical to a value obtained by accumulating and normalizing the frequency distribution. Likewise, when the APD is used as the feature, the feature is not the distribution function itself, but is a discrete value obtained by integration on each constant reception level. That is, the feature is substantially identical to a value obtained by accumulating and normalizing the frequency distribution.

Even if the first feature extracted by the feature extraction unit 20 is any form (type) of features shown in FIGS. 6A to 6D, the first feature may be converted into any form of features shown in FIGS. 6A to 6D and used in the latter process in principle. Accordingly, the forms (types) of features different from each other may be adopted as the first feature and the second feature.

Furthermore, the feature may be the event probability and the like at each reception level as shown in FIG. 6B extracted on each frequency (sub-carrier of FFT process) obtained by spectrogram representation, or an integrated value of event probabilities and the like at each reception level as shown in FIG. 6C extracted on corresponding frequencies (sub-carriers). That is, the feature may be a high-dimensional (multi-dimensional) feature vectors that includes a matrix of a frequency dimension and a reception level dimension on every extraction time period.

Figure 7:
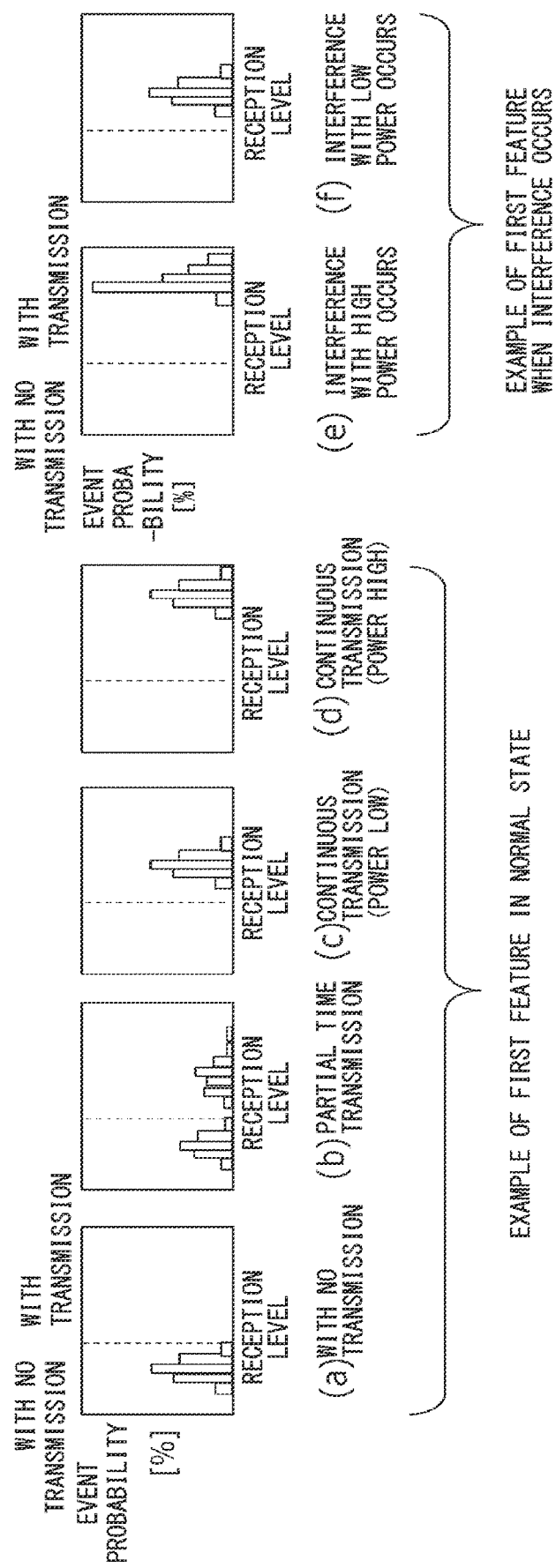
FIG. 7 is a diagram for illustrating a first feature extracted by the radio wave anomaly detection system according to the first example embodiment, and a method of detecting a radio wave anomaly through use thereof.

FIG. 7 is a diagram for illustrating a first feature extracted by the radio wave anomaly detection system 100, and a method of detecting a radio wave anomaly through use thereof. FIG. 7 shows an example of the first feature at any frequency extracted every extraction time period T1 (e.g., 5 ms) configured based on the wireless standard and multiplexing period of the wireless communication system to be monitored. Note that in the example in FIG. 7, the probability density distribution (PDF) shown in FIG. 6B is used as the first feature.

Here, in a certain case of important wireless communication for monitoring a radio wave emission situation, and a certain case of a wireless communication system to be monitored, radio wave transmission may sometimes be performed on demand as with the local 5G and wireless LAN (Local Area Network), for example. In such cases, for example, any of various forms of features shown in (a) to (d) of FIG. 7 are extracted as "the first feature in the normal state (without radio interference or failure)".

Specifically, various forms of features are extracted as "the first feature in the normal state", as follows: (a) no transmission (received data in all the time periods in received data in the extraction time period T1 includes no transmitted signal), (b) partial time transmission (received data in some time periods in received data in the extraction time period T1 includes no transmitted signal), (c) continuous transmission (received data in all the time periods in received data in the extraction time period T1 includes transmitted signal at a low reception level), and (d) continuous transmission (received data in all the time periods in received data in the extraction time period T1 includes transmitted signal at a high reception level).

For example, in a case where in the learning process the learning unit 60 performs machine learning using only the four types of first features shown in (a) to (d) of FIG. 7 and generates the learned model 70, in the determination process the determination unit 80 uses the learned model 70 and thus determines that first features similar to the four types of first features described above are normal while determining first features deviating from the four types of first features described above are abnormal.

That is, in the case where in the learning process the machine learning is performed using only the four types of first features as shown in (a) to (d) of FIG. 7, in the determination process the determination unit 80 determines that the first features similar to the four types of first features described above, which are the normal states, are "normal" as expected.

Next, the first features extracted when interference occurs is described. For example, features with continuous occurrence of interference with high power as shown in (e) of FIG. 7, and features with continuous occurrence of interference with low power as shown in (f) of FIG. 7 are extracted as the "first features when interference occurs". Note that in (e) and (f) of FIG. 7, interference continuously occurs. Accordingly, a reception level with no transmission does not occur in appearance.

For example, first features with the interference with high power as shown in (e) of FIG. 7 continuously occurring are different from any of the first features shown in (a) to (d) of FIG. 7 and the like. Accordingly, the determination unit 80 determines that it is "abnormal" as expected. On the other hand, first features with interference with low power continuously occurring as shown in (f) of FIG. 7 are substantially identical to the first features shown in (c) of FIG. 7 among the first features shown in (a) to (d) of FIG. 7. Accordingly, the determination unit 80 possibly determines that it is "normal" against expectation.

Accordingly, in this example embodiment, the learning process and the determination process are performed by using not only the first feature, which is the short-term feature, but also the second feature, which is the long-term feature, whereby the accuracy of the anomaly detection by the determination unit 80 may be improved.

Figure 8:
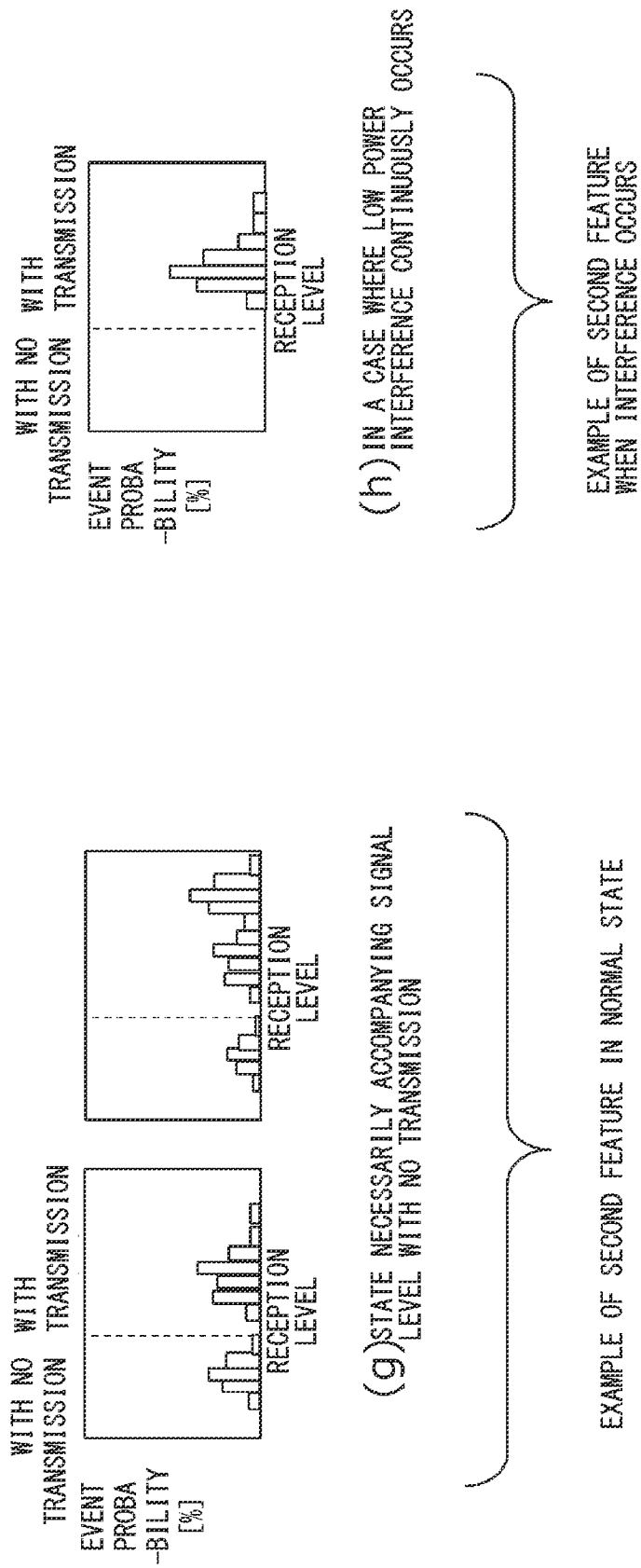
FIG. 8 is a diagram for illustrating a second feature extracted by the radio wave anomaly detection system according to the first example embodiment, and a method of detecting a radio wave anomaly through use thereof.

FIG. 8 is a diagram for illustrating the second feature extracted by the radio wave anomaly detection system 100, and a method of detecting a radio wave anomaly through use thereof. FIG. 8 shows an example of the second feature at any frequency re-extracted every extraction time period T2 (e.g., five seconds) determined by the extraction time period determination unit 40. Note that in the example in FIG. 8, the probability density distribution (PDF) shown in FIG. 6B is used as the second feature.

The feature re-obtaining unit 30 aggregates a plurality of the first features extracted every extraction time period T1 (5 ms) by the feature extraction unit 20, every extraction time period T2 (e.g., five seconds), and applies a process of adding the occurrence frequencies and probabilities at corresponding reception levels, to a plurality of the first features aggregated every extraction time period T2 (step S31). The result of the adding process in every extraction time period T2 (step S32) is output as the second feature by the feature re-obtaining unit 30 (step S33).

Here, the wireless communication system that transmits radio waves on demand does not always output radio waves. Accordingly, the extraction time period determination unit 40 calculates a extraction time period exceeding the maximum continuous transmission time (the time in which the signal level is maintained) in the normal state, and sets the period as the extraction time period T2. Thus, for example, the feature re-obtaining unit 30 extracts features in a form shown in (g) of FIG. 8, as "the second feature in the normal state (without radio interference or failure)". That is, for example, "the feature always accompanied by occurrence of a reception level with no transmission (in other words, the feature accompanied by a time period with no transmitted signal being included in the received data in the extraction time period T2)" as shown in (g) of FIG. 8 is extracted as "the second feature in the normal state". This is because it is a result of the second features as shown in (g) of FIG. 8 are accumulated so as to include the first features as shown in (a) or (b) of FIG. 7.

Subsequently, in the learning unit 60, not only the first features but also the second features are (for example, high-dimensionalized or linked and) learned, thereby constructing the learned model 70 obtained by learning, as the second feature in the normal state, "the feature always accompanied by occurrence of a reception level with no transmission (in other words, the feature accompanied by a time period with no transmitted signal being included in the received data in the extraction time period T2)" as shown in (g) of FIG. 8 in terms of the dimension of the second feature.

Here, upon obtainment of received data accompanied by continuous occurrence of interference with low power, "the feature not accompanied by occurrence of a reception level with no transmission (in other words, the feature not accompanied by a time period in which the received data includes no transmitted signal in the extraction time period T2)" as shown in (h) of FIG. 8 is extracted as "the second feature in the normal state", for example. Accordingly, the second feature extracted from the received data accompanied by continuous occurrence of interference with low power as shown in (h) of FIG. 8 is different from the second feature shown in (g) of FIG. 8 in terms of presence or absence of the reception level with no transmission. Accordingly, the determination unit 80 determines the feature to be "abnormal" as expected. That is, the determination unit 80 applies the determination process using the first features and the second features, to received data that would be erroneously determined to be "normal" through the determination process using only the first features, thereby allowing the features to be determined to be "abnormal" as expected.

Figure 9:
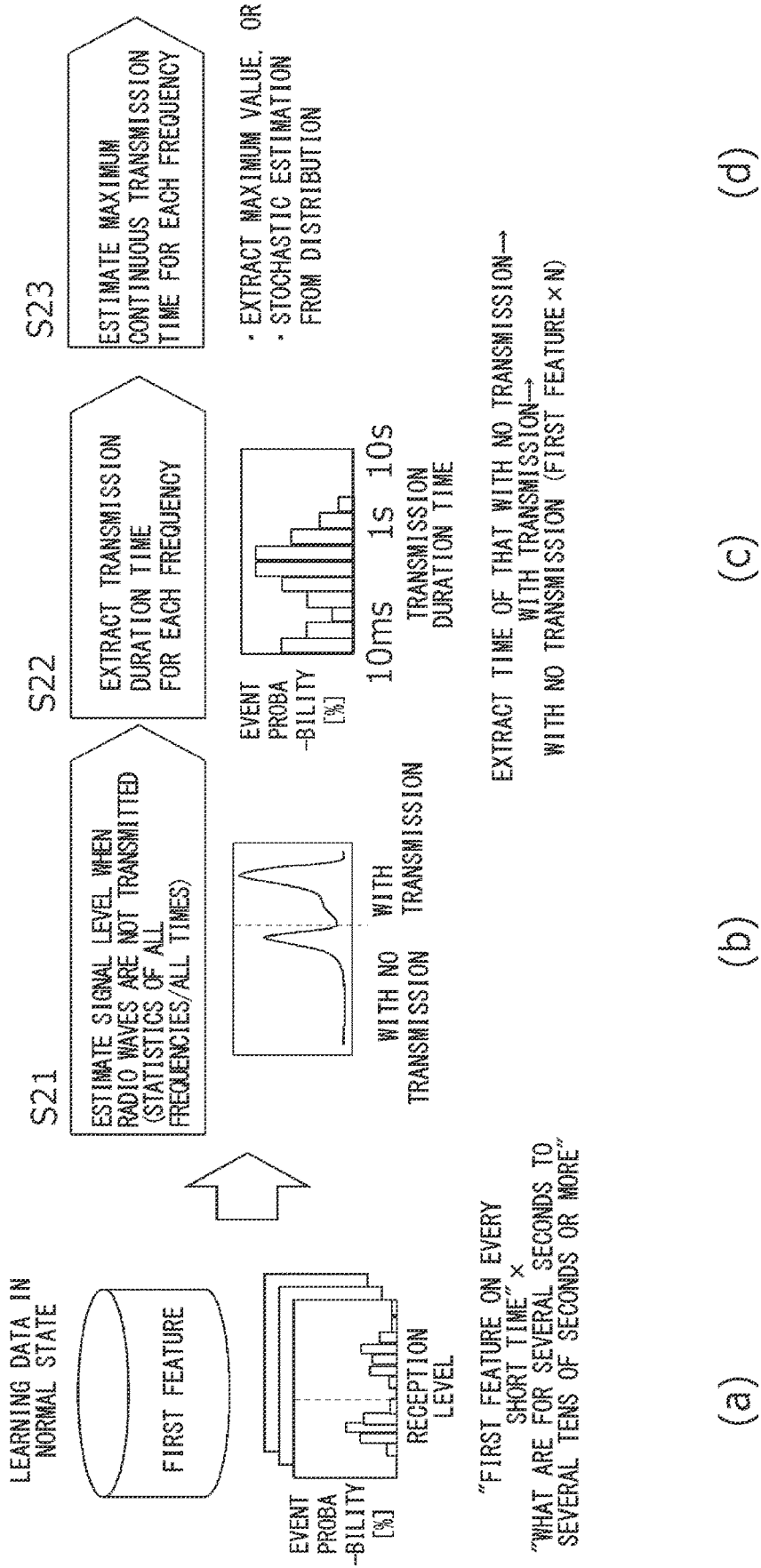
FIG. 9 is a diagram for illustrating a method of determining a extraction time period for the second feature extracted by the radio wave anomaly detection system according to the first example embodiment.

Lastly, the details of the method of determining the extraction time period T2 by the extraction time period determination unit 40 are described. FIG. 9 is a diagram for illustrating the method of determining the long-term extraction time period T2 by the extraction time period determination unit 40.

As described above, this example embodiment has an object to set the extraction time period exceeding the maximum continuous transmission time in the normal state for the extraction time period T2, and perform the determination process using the second feature detected every extraction time period T2, thereby allowing detection of continuous interference. Here, it is desirable that the extraction time period T2 be as short a time period as possible among long time periods allowing continuous interference to be detected.

First, in the extraction time period determination unit 40, the signal level estimation unit 46 estimates the boundary between the reception level "with no transmission" that is a reception level including no transmitted signal, and a reception level "with transmission" that is a reception level including a transmitted signal, among the reception levels. The signal level estimation unit 46 then estimates the reception level equal to or higher than the boundary, as the reception level (signal level) including a transmitted signal, among the reception levels (step S21). Note that the extraction time period determination unit 40 does not necessarily include the signal level estimation unit 46, and may receive and set information on the signal level estimated by a signal level estimation function provided outside.

In more details, first, as shown in (a) and (b) of FIG. 9, a distribution of reception levels for every freely selected frequency is created, using each first feature extracted from the received data that is of several seconds to several tens of seconds, and has been collected for learning. Subsequently, the boundary between a noise level and the signal level in the distribution of the reception levels is estimated. In the boundary estimation, for example, among local peaks (clusters) of the distribution, a local peak (cluster) of the distribution on the lowest reception level side is assumed as the noise level, and the first local minimum (downward convex) viewed from the lower reception level side is calculated as the boundary. Note that the local minimum may be a point at which the number of occurrences is changed from monotonic decrease to monotonic increase viewed from the lower reception level, or a point at which the slope is changed from negative to positive according to the first-order differentiation. Alternatively, the entire distribution may be clustered, and what is between the distribution cluster with the lowest reception level and the second lowest distribution cluster may be estimated as the boundary. Among the reception levels, the reception level equal to or higher than the estimated boundary may then be estimated as the reception level (signal level) including a transmitted signal.

Next, in the extraction time period determination unit 40, the maximum continuous transmission time estimation unit 47 extracts the transmission duration time of each transmitted signal in the normal state (step S22). For example, as shown in (c) of FIG. 9, the maximum continuous transmission time estimation unit 47 uses a plurality of first features in several seconds to several tens of seconds or more, extracts a time (extraction time period T1×n (n is an integer equal to or more than zero)) after switching from the first feature where the reception level "with no transmission" occurs to the first feature where only the reception level "with transmission" occurs, until switching to the first feature where the reception level "with no transmission" occurs again, for every freely selected frequency, and achieves a frequency distribution. In other words, the maximum continuous transmission time estimation unit 47 extracts a time after switching from the first feature with an untransmitted time slot (the distribution of reception levels of noise level less than the signal level) to the first feature with no untransmitted time slot, until switching again to the first feature with an untransmitted time slot, and achieves a frequency distribution. Further in other words, the maximum continuous transmission time estimation unit 47 extracts a time after the received data begins to include the transmitted signal, until the received data begins to include no transmitted signal, for every freely selected frequency, and achieves a frequency distribution. The maximum continuous transmission time estimation unit 47 then estimates the maximum continuous transmission time, based on the frequency distribution of continuous transmission time period (step S23).

For example, as shown in (d) of FIG. 9, the maximum value on the frequency distribution may be estimated as the maximum continuous transmission time as it is, or a value obtained by adding a margin to the maximum value on the frequency distribution may be estimated as the maximum continuous transmission time. The margin in this case has, for example, a value that is 5 to 10% of the maximum value on the frequency distribution. Alternatively, the maximum continuous transmission time may be statistically or stochastically estimated from the frequency distribution. For example, the frequency distribution may be assumed to follow a Gaussian distribution or a normal distribution, the mean and variance may be calculated (subjected to regression analysis), and then the maximum continuous transmission time may be estimated based on a point at probability of 95.5% (2σ), 99.7% (3σ) or 99.99% (4σ). For example, when the estimated value is larger than the maximum value on the frequency distribution, the estimated value is adopted as the maximum continuous transmission time.

As described above, the radio wave anomaly detection system 100 (101) according to this example embodiment causes the detection process unit 50 to perform learning and detection, using both the first feature extracted every short-term extraction time period T1 through the feature extraction unit 20, and the second feature extracted every long-term extraction time period T2 through the feature re-obtaining unit 30. The radio wave anomaly detection system 100 (101) according to this example embodiment then causes the extraction time period determination unit 40 to estimate the maximum continuous transmission time in the normal state and determine the long-term extraction time period T2 in conformity with the maximum continuous transmission time in order to detect interference (anomaly) from the received data accompanied by continuous occurrence of interference with low power. Accordingly, the radio wave anomaly detection system 100 according to this example embodiment can apply learning and determination using not only the first features but also the second features to the received data accompanied by continuous occurrence of interference with low power and incapable of being determined to be "abnormal" by the determination process using only the first features that are short-term features, thereby allowing determination of "anomaly" as expected.

That is, the radio wave anomaly detection system 100 (101) according to this example embodiment can also detect radio interference and failure characterized also in a period (e.g., a period longer than the extraction time period T1) which is different from the extraction time period T1 and in which no anomaly is detectable only with the first feature extracted every short-term extraction time period T1. The radio wave anomaly detection system 100 (101) according to this example embodiment performs the determination process of whether the received data includes a radio wave anomaly or not using the learned model generated by unsupervised learning. Accordingly, for example, unknown radio interference and failure that have a low reception level and are not included in the training data can be detected.

Note that the determination process using only the second feature, which is the long-term feature, is possibly incapable of instantaneously occurring radio interference and failure as shown in (e) of FIG. 7. This is because the first feature extracted every extraction time period T1, such as 5 ms, from the received data including instantaneously occurring radio interference and failure is the feature having an anomalous shape that does not occur in the normal state as shown in (e) of FIG. 7 but the second feature extracted every long-term extraction time period T2, such as five seconds, is a feature where effects by instantaneous occurring radio interference and the like are averaged.

Accordingly, the radio wave anomaly detection system 100 (101) according to this example embodiment performs learning and determination using both the first feature, which is the short-term feature in consideration of the wireless standard, the multiplexing period and the like of the wireless communication system, and the second feature, which is the long-term feature in consideration of the maximum continuous transmission time, thereby allowing this system to determine any of received data accompanied by continuous occurrence of interference with low power, and received data with radio interference and failure instantaneously occurring, to be "abnormal" as expected (i.e., an anomaly can be accurately detected).

Note that in this example embodiment, the case has been described where the radio wave anomaly detection system 100 (101) includes both the learning process function and the determination process function. However, there is no limitation thereto. This system may only include the determination process function. Hereinafter, referring to FIG. 10, description is simply made.

Figure 10:
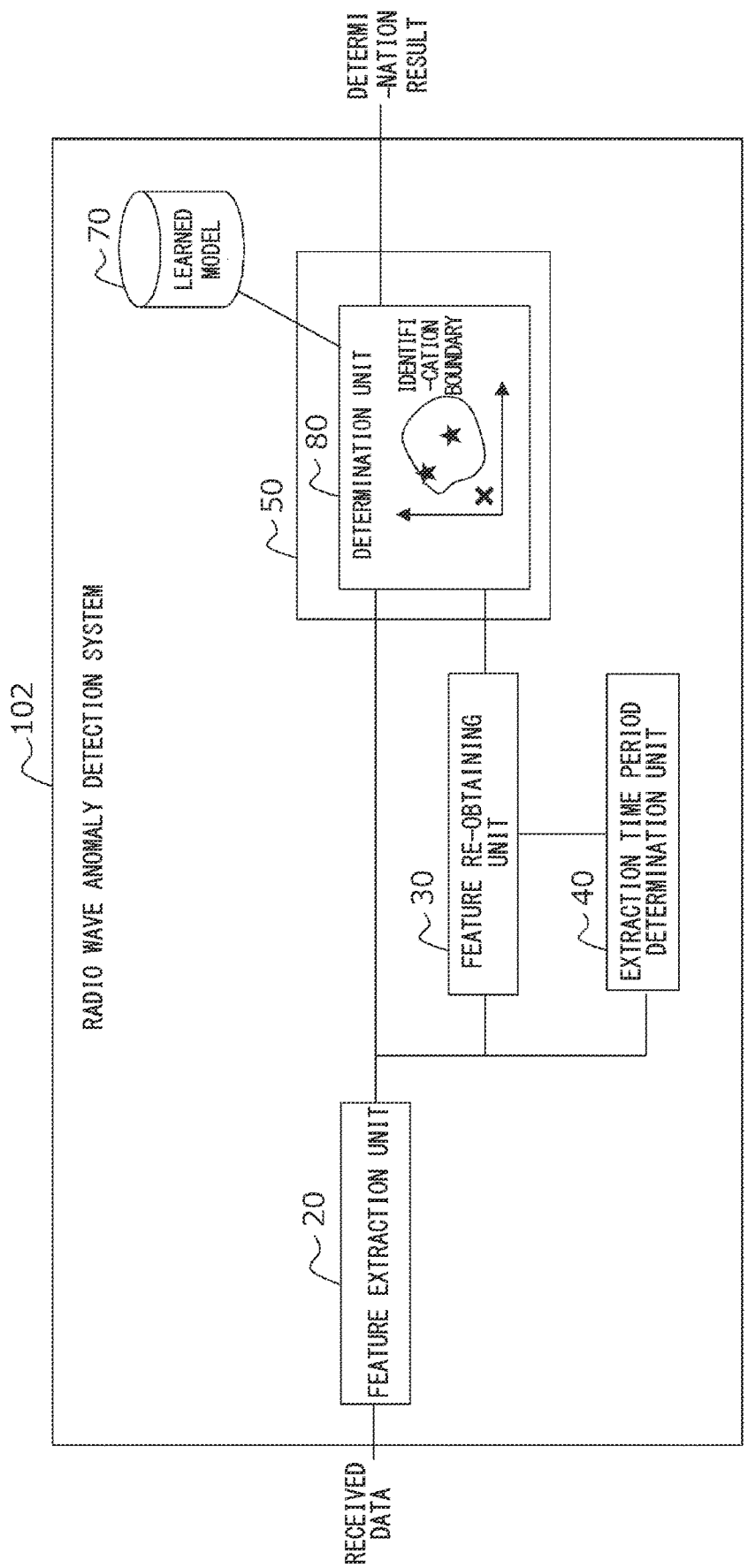
FIG. 10 is a block diagram showing a second modification example of a radio wave anomaly detection system according to the first example embodiment.
Figure 11:
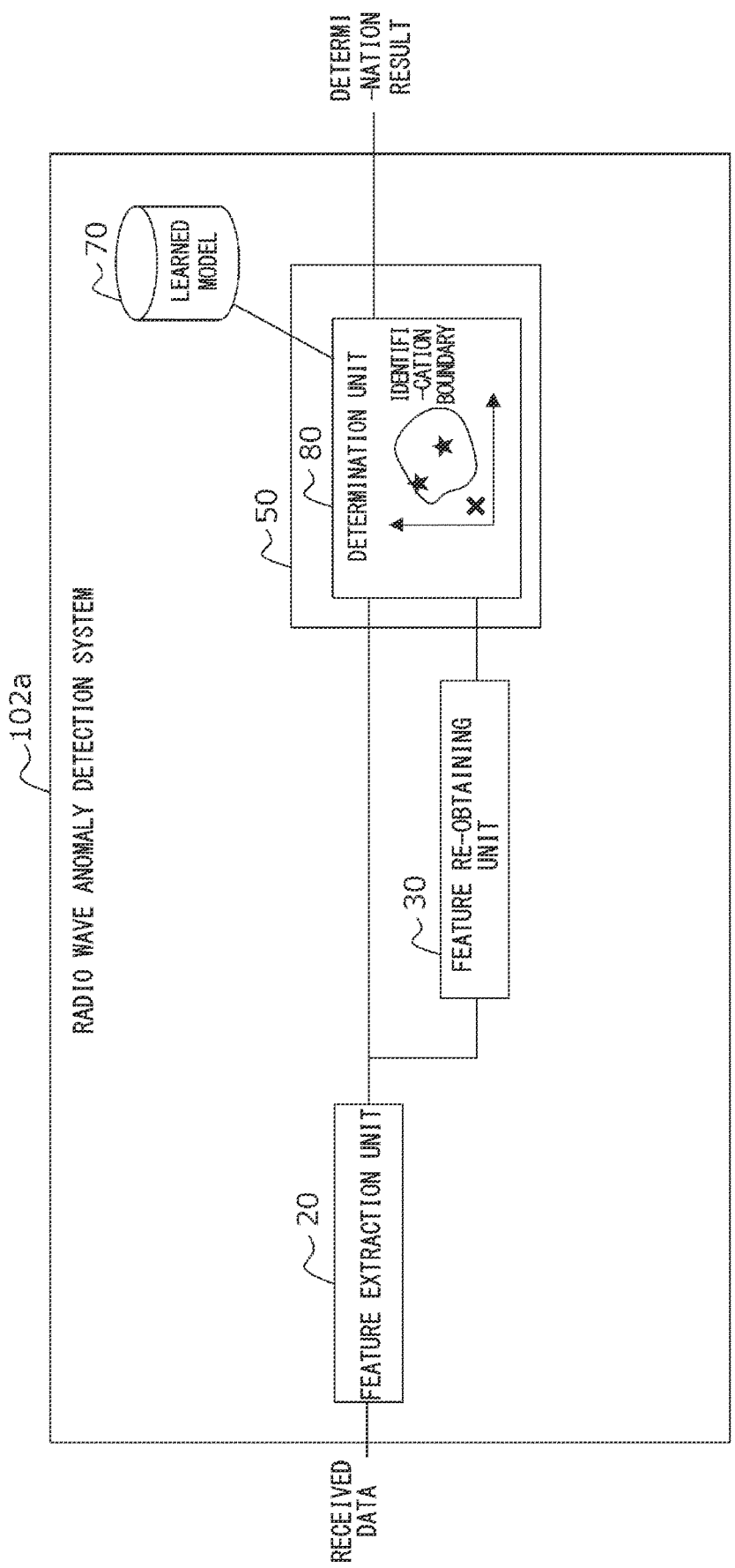
FIG. 11 is a block diagram showing a modification example of the radio wave anomaly detection system shown in FIG. 10.

FIG. 10 is a block diagram showing a modification example of the radio wave anomaly detection system 100 as a radio wave anomaly detection system 102. In comparison with the radio wave anomaly detection system 100, the radio wave anomaly detection system 102 does not include the learning process function, and only includes the determination process function. The other configuration of the radio wave anomaly detection system 102 is similar to that of the radio wave anomaly detection system 100. Accordingly, the description is omitted. Note that the radio wave anomaly detection system 102 achieves the determination process function using the preliminarily prepared learned model 70. Note that the radio wave anomaly detection system 102 may include the extraction time period determination unit 40 as shown in FIG. 10, or may obtain information on the extraction time period T2 determined by the separately provided extraction time period determination unit 40 or the like and cause the feature re-obtaining unit 30 to extract the second feature. FIG. 11 is a block diagram showing a modification example of the radio wave anomaly detection system 102 as a radio wave anomaly detection system 102a. In comparison with the radio wave anomaly detection system 102, the radio wave anomaly detection system 102a does not include the extraction time period determination unit 40, and obtains information on the extraction time period T2 determined by the separately provided extraction time period determination unit 40 (not shown) or the like and cause the feature re-obtaining unit 30 to extract the second feature.

In this example embodiment, the example where the feature re-obtaining unit 30 re-obtains the feature using a plurality of the first features extracted by the feature extraction unit 20 and thus generates the second feature, is used and described. However, there is no limitation thereto. The feature re-obtaining unit 30 may extract the second feature directly from the received data only if this unit can generate the similar second feature. Furthermore, in this example embodiment, the example of detecting continuous occurrence of interference with low power using the second feature is used and described. It is a matter of course that irrespective of the magnitude of the power, continuous occurrence of interference can be detected.

Second Example Embodiment

Figure 12:
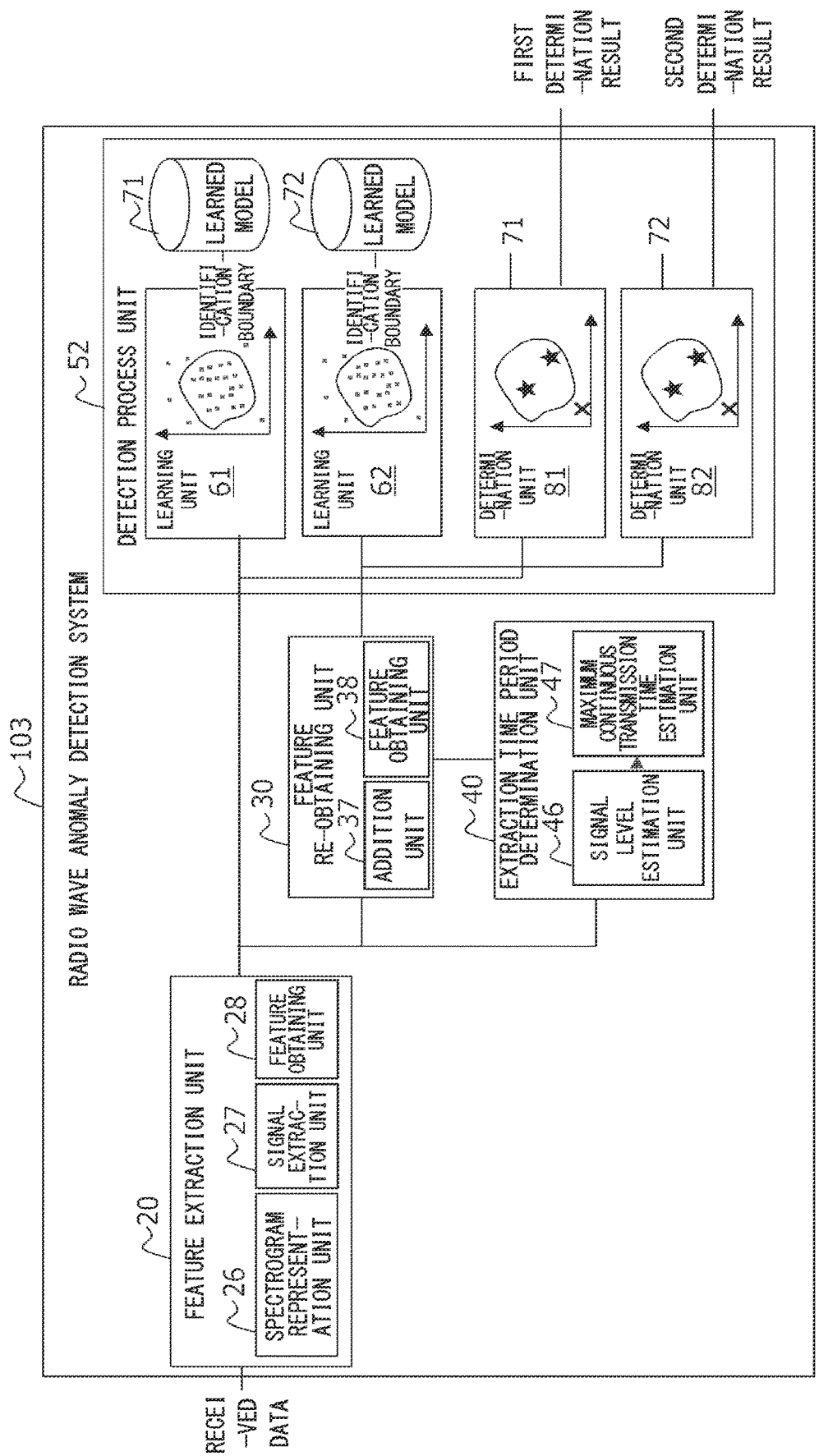
FIG. 12 is a block diagram showing an overall configuration of a radio wave anomaly detection system according to a second example embodiment.

FIG. 12 is a block diagram showing a configuration example of a radio wave anomaly detection system 103 according to a second example embodiment. In the radio wave anomaly detection system 103, a detection process unit separately includes: a function of performing learning and determination using the first feature, which is a short-term feature; and a function of performing learning and determination using the second feature, which is a long-term feature. Note that in the radio wave anomaly detection system 103, part of each of processes that are the learning process and the determination process is achieved using a common processing circuit. However, the learning process and the determination process may be achieved using processing circuits different from each other.

The radio wave anomaly detection system 103 at least includes, for example: a feature extraction unit 20 of extracting a first feature that is a short-term feature; a feature re-obtaining unit (second feature extraction unit) 30 of extracting a second feature that is a long-term feature by re-obtaining a feature using a plurality of the first features extracted by the feature extraction unit 20; an extraction time period determination unit 40 of determining the extraction time period of the second feature by the feature re-obtaining unit 30; and a detection process unit (anomaly detection unit) 52 of learning a model representing presence or absence of a radio wave anomaly in received data, and determining presence or absence of a radio wave anomaly in the received data.

Here, the configurations of the feature extraction unit 20, the feature re-obtaining unit 30, and the extraction time period determination unit 40 are similar to the feature extraction unit 20, feature re-obtaining unit 30, and the extraction time period determination unit 40 provided for the radio wave anomaly detection system 100. Accordingly, the description is omitted. Hereinafter, the detection process unit 52 is mainly described.

The detection process unit 52 includes a learning unit 61, a learning unit 62, a database 71, a database 72, a determination unit 81, and a determination unit 82.

The learning unit 61 performs machine learning of a mode representing whether the received data includes a radio wave anomaly or not using a plurality of the first features extracted by the feature extraction unit 20 in the learning process. The learning unit 62 performs machine learning of a mode representing whether the received data includes a radio wave anomaly or not using a plurality of the second feature extracted by the feature re-obtaining unit 30 in the learning process. The database 71 stores a learned model (hereinafter, also called a learned model 71) generated by the machine learning by the learning unit 61. The database 72 stores a learned model (hereinafter, also called a learned model 72) generated by the machine learning by the learning unit 62.

In the determination process, the determination unit 81 determines whether the received data includes a radio wave anomaly or not, using the first features extracted from the received data and the learned model 71, in the determination process. In the determination process, the determination unit 82 determines whether the received data includes a radio wave anomaly or not, using the second features extracted from the received data and the learned model 72, in the determination process. Determination results of the determination units 81 and 82 are separately output as first and second determination results from the detection process unit 52.

It is assumed that the feature is a statistical feature extracted every predetermined time period, such as a frequency distribution (histogram), a probability density function (PDF), a cumulative distribution function (CDF), or an amplitude probability density (APD), for example. Note that the feature may be directly extracted from received data on a time axis. Alternatively, the data may be converted into data on a frequency axis through spectrum representation or spectrogram representation, and then the feature may be extracted on a frequency-by-frequency basis.

(Operation of Radio Wave Anomaly Detection System 103)

Subsequently, the operation of the radio wave anomaly detection system 103 according to the second example embodiment is described. Note that the flow of overall processes by the radio wave anomaly detection system 103 is similar to the flow of overall processes by the radio wave anomaly detection system 100 shown in FIG. 3.

(Details of Learning Processes by Radio Wave Anomaly Detection System 103)

Figure 13A:
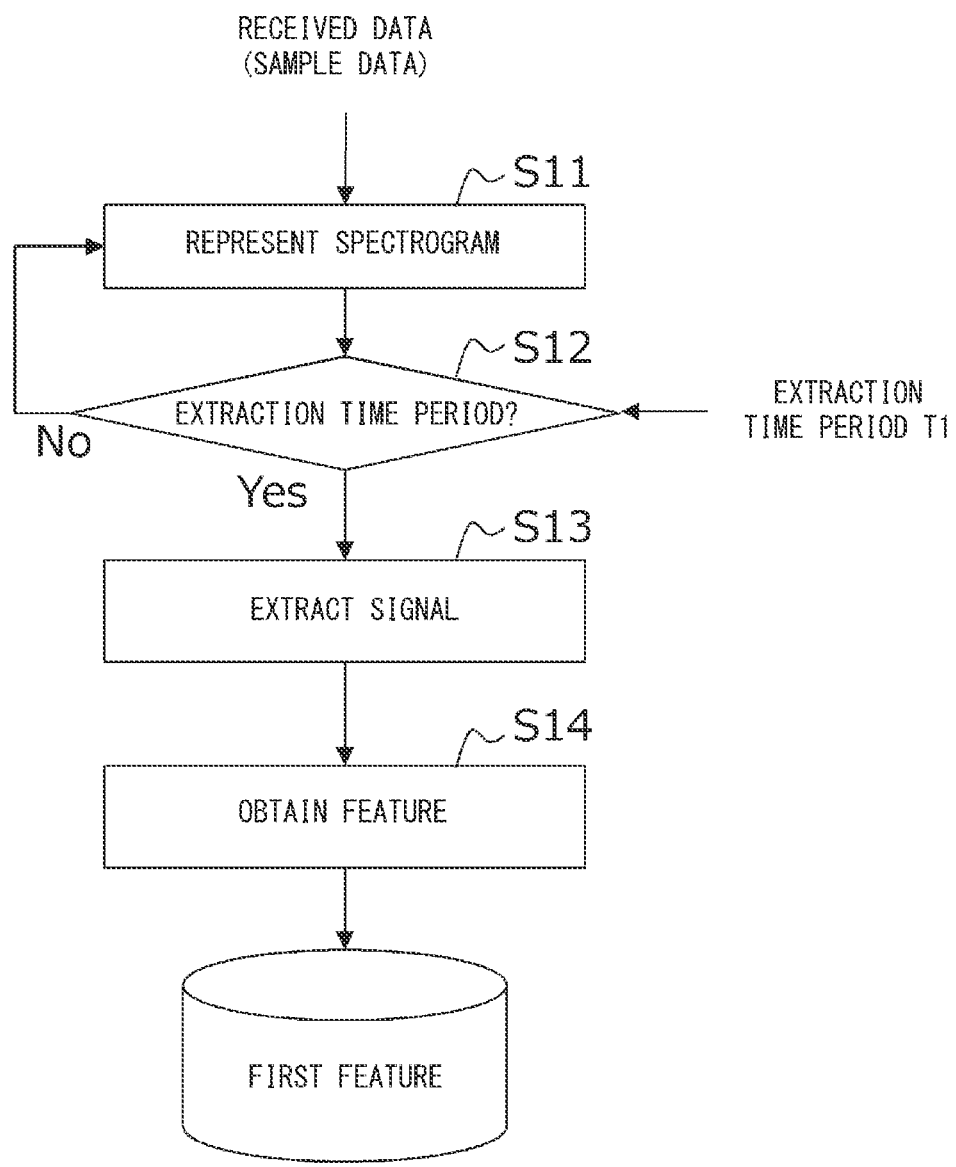
FIG. 13A is a flowchart showing a flow of a learning process through the radio wave anomaly detection system according to the second example embodiment.
Figure 13B:
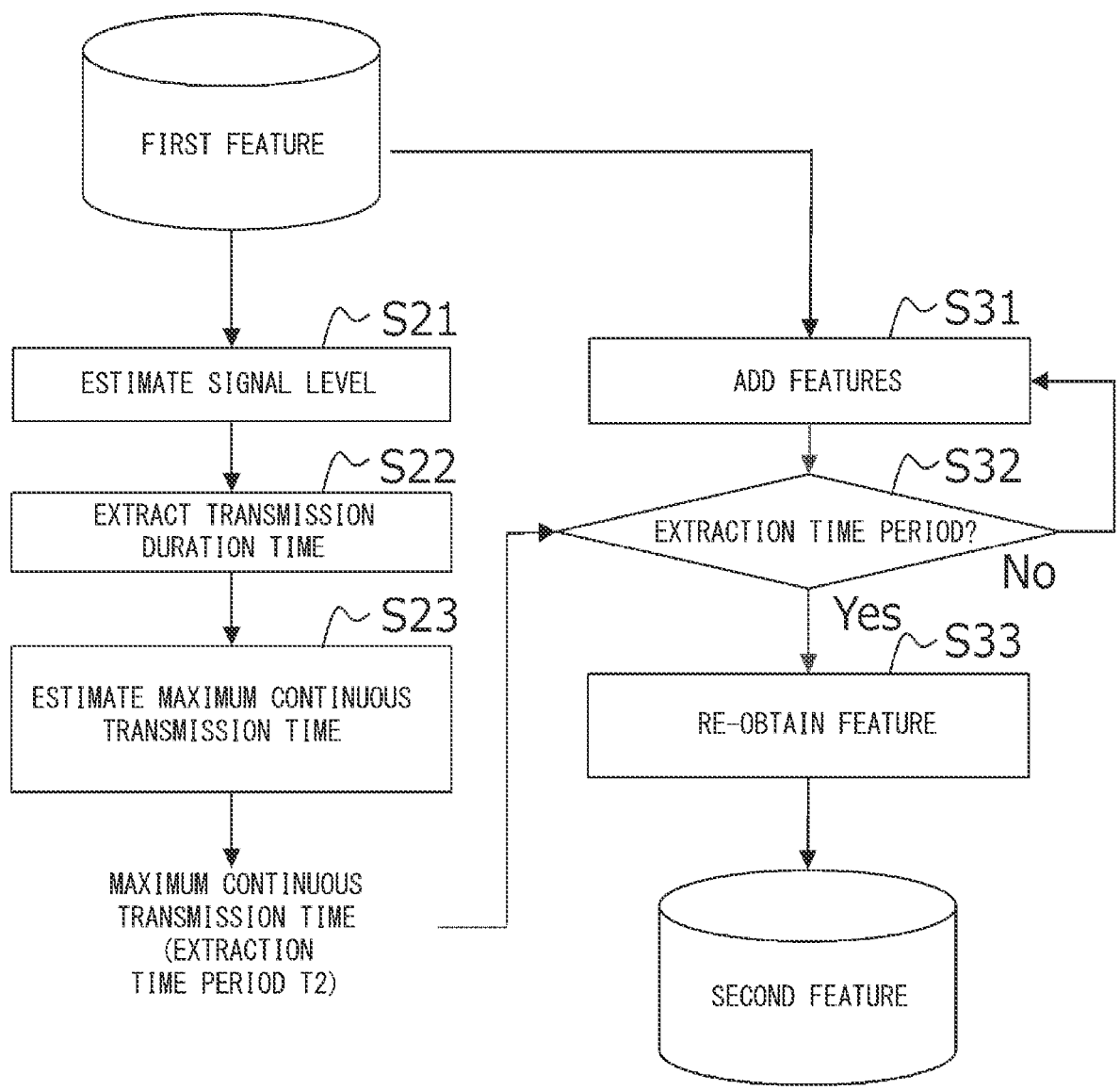
FIG. 13B is a flowchart showing a flow of the learning process through the radio wave anomaly detection system according to the second example embodiment.
Figure 13C:
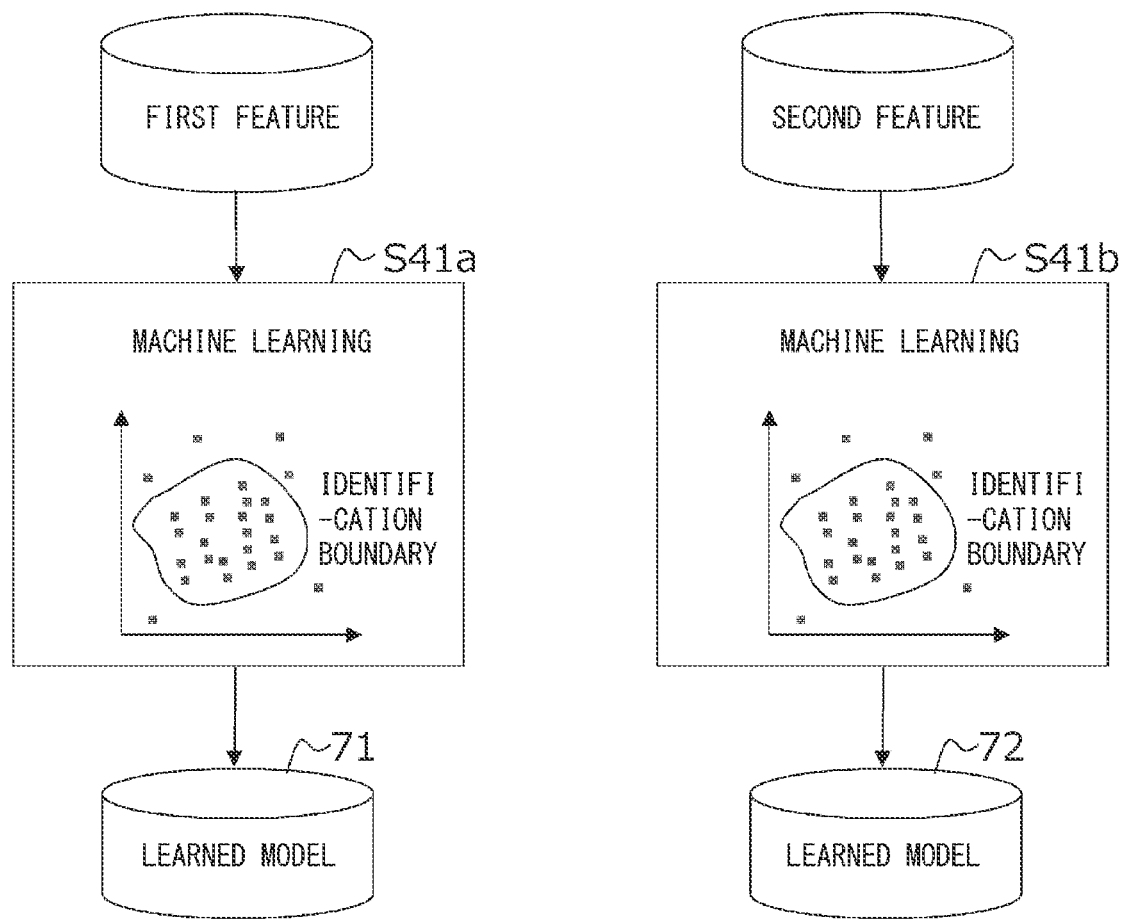
FIG. 13C is a flowchart showing a flow of the learning process through the radio wave anomaly detection system according to the second example embodiment.

FIGS. 13A to 13C are flowcharts showing flows of the learning processes through the radio wave anomaly detection system 103 according to the second example embodiment.

It is assumed that the learning processes shown in FIGS. 13A to 13C collects received data in a normal state (at the normal time), as sample data. Note that among the learning processes, the process of extracting the first feature through the feature extraction unit 20, the process of determining the extraction time period T2 for the second feature through the extraction time period determination unit 40, and the process of extracting the second feature through the feature re-obtaining unit 30 are similar to those in the case of the radio wave anomaly detection system 100. Accordingly, the description thereof is omitted.

Hereinafter, among the learning processes, the machine learning process (steps S41a and S41b) characteristic in the radio wave anomaly detection system 103 is described.

The learning unit 61 performs machine learning of a model representing whether the received data includes a radio wave anomaly (radio interference and failure) or not using feature vectors that high-dimensionally (multi-dimensionally) represent first features extracted every short-term extraction time period T1 (step S41a). The learning unit 62 performs machine learning of a model representing whether the received data includes a radio wave anomaly (radio interference and failure) or not using feature vectors that high-dimensionally (multi-dimensionally) represent second features extracted every long-term extraction time period T2 (step S41b).

This example embodiment assumes a case where the machine learning adopted by the learning units 61 and 62 is unsupervised learning in order to detect unknown interference and failure that are difficult to be preliminarily defined as training data, and assumes a case of one-class SVM, for example. Note that the machine learning adopted by the learning units 61 and 62 is not limited to one-class SVM. For example, machine learning of a model, such as an anomaly detection model using deep learning and the like (Deep Anomaly Detection), may be adopted. Alternatively, the machine learning adopted by the learning units 61 and 62 may use a method of learning a threshold for statistically detecting an anomaly using the Mahalanobis distance, variance (standard deviation) and the like, from the distribution of the high-dimensional (multi-dimensional) feature vectors as described above, and a method of predicting the change tendency using a state filter, such as a Kalman filter or a particle filter, and detecting whether to deviate from the change tendency or not, with no problem. Furthermore, the machine learning adopted by the learning units 61 and 62 is not limited to the unsupervised learning, and may be supervised learning instead.

The learned model, the threshold for detecting an anomaly, the coefficient indicating the change tendency and the like generated by the machine learning by the learning units 61 and 62 are stored in the respective databases 71 and 72.

(Details of Determination Process by Radio Wave Anomaly Detection System 103)

Figure 14:
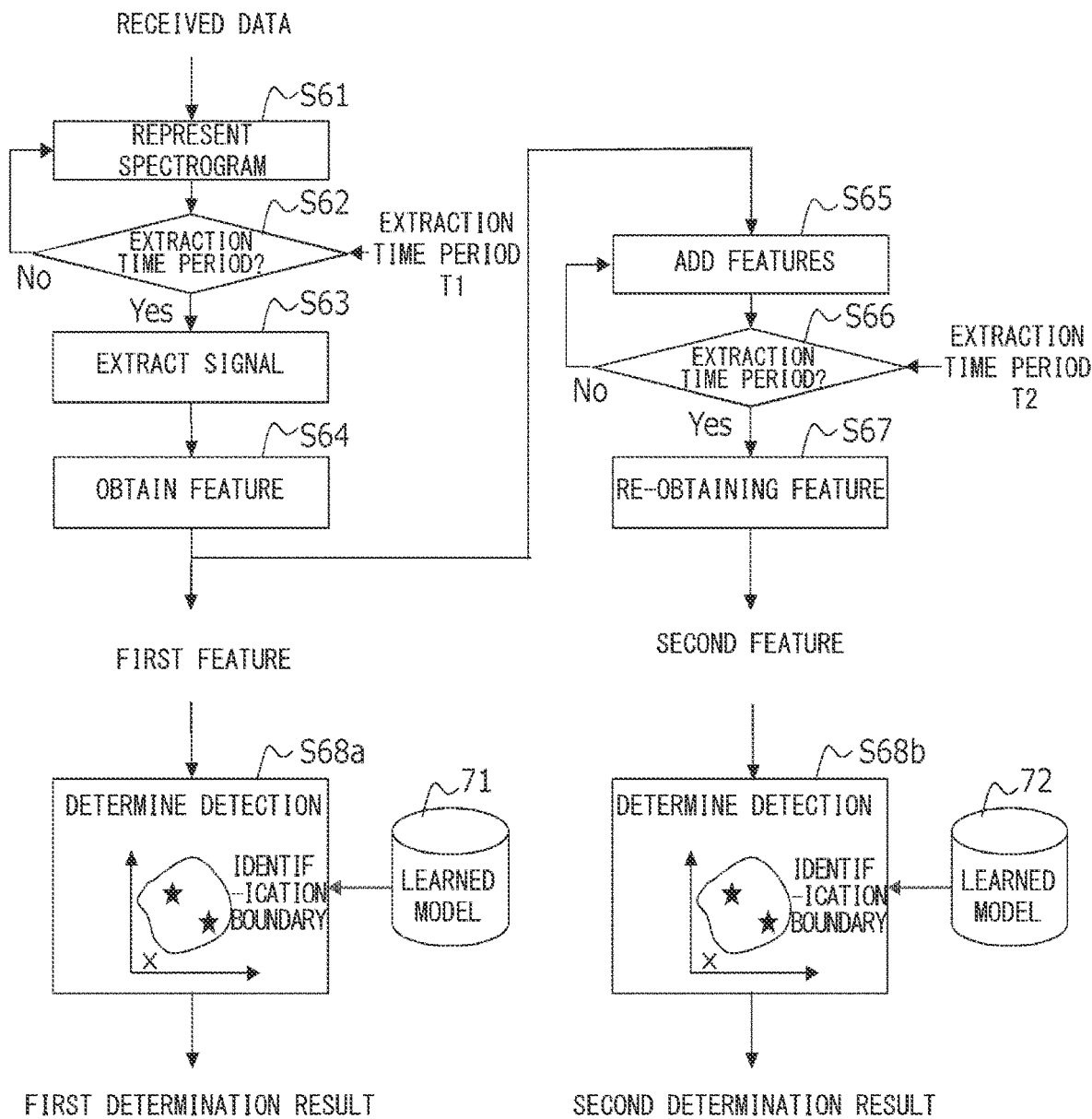
FIG. 14 is a flowchart showing a flow of a determination process through the radio wave anomaly detection system according to the second example embodiment.

FIG. 14 is a flowchart showing a flow of a determination process through the radio wave anomaly detection system 103 according to the second example embodiment.

The determination process shown in FIG. 14 is a process of obtaining received data from a radio wave environment to be monitored at the time of actual operation, and sequentially performing the detection determination of radio interference and failure. Note that among the determination processes, the process of extracting the first feature through the feature extraction unit 20, and the process of extracting the second feature through the feature re-obtaining unit 30 are similar to those in the case of the radio wave anomaly detection system 100. Accordingly, the description thereof is omitted.

Hereinafter, among the determination processes, the detection determination process (steps S68*a* and S68*b*) characteristic in the radio wave anomaly detection system 103 is described.

First, the determination unit 81 performs a first detection determination process, using the first features sequentially extracted from the received data, and the learned model 71 generated by the machine learning by the learning unit 61 in the learning process (step S68*a*).

For example, in a case where the learned model 71 has been generated by machine learning, such as one-class SVM, which is a type of unsupervised learning, the determination unit 81 receives the feature vectors high-dimensionally (multi-dimensionally) representing the first features, then converts the positional relationship and the distances of the feature vectors for an identification boundary constructed in the learned model 71, into normality (or abnormality), and outputs this. The determination unit 81 then outputs a first determination result of whether the received data includes a radio wave anomaly or not, based on the calculation result.

First, the determination unit 82 performs a second detection determination process, using the second features extracted every extraction time period T2, and the learned model 72 generated by the machine learning by the learning unit 62 in the learning process (step S68*b*).

For example, in a case where the learned model 72 has been generated by machine learning, such as one-class SVM, which is a type of unsupervised learning, upon receipt of the feature vectors high-dimensionally (multi-dimensionally) representing the second features, the determination unit 82 converts the positional relationships and the distances of the feature vectors for an identification boundary constructed in the learned model 72, into normality (or abnormality), and outputs this. The determination unit 82 then outputs a second determination result of whether the received data includes a radio wave anomaly or not, based on the calculation result.

Note that in cases of statistically detecting an anomaly using the Mahalanobis distance, variance (standard deviation) and the like, the determination units 81 and 82 may calculate the distances of the feature vectors from a learned threshold having been learned in the learning process, and output the distances as a determination result. Alternatively, in cases of predicting the change tendency using a state filter, such as a Kalman filter or a particle filter, the determination units 81 and 82 may calculate the deviation degrees of the feature vectors from a coefficient indicating the change tendency, and output the degrees as a determination result.

As described above, the radio wave anomaly detection system 103 according to this example embodiment can exert advantageous effects equivalent to those of the radio wave anomaly detection system 100. The radio wave anomaly detection system 103 separately executes the process of learning and determination using the first feature extracted every short-term extraction time period T1, and the process of learning and determination using the second feature extracted every long-term extraction time period T2. Accordingly, the radio wave anomaly detection system 103 can separately output the first determination result of the determination process using the first features, which are the short-term features, and the second determination result of the determination process using the second features, which are the long-term features. Accordingly, for example, the user can more correctly identify the factors and states of radio interference and failure from the combination of the first and second determination results.

Specifically, for example, in a case where a short-term extraction time period, such as 5 ms, is set as the extraction time period T1 based on the wireless standard, the multiplexing scheme and the like of the important wireless communication and the wireless communication system to be monitored, the determination result indicating "anomaly" is output as the first determination result in case interference or failure having large variation instantaneously occurs in the order of the extraction time period T1. On the other hand, in a case where the long-term extraction time period, such as five seconds, is set as the extraction time period T2 based on the estimated maximum continuous transmission time, the determination result indicating "anomaly" is output as the second determination result in case interference or failure is continuously occurring in the extraction time period T2. The user can easily estimate the magnitude of variation in interference or failure, and whether the interference or failure is instantaneous or continuous, from the combination of these determination results.

Note that in this example embodiment, the case has been described where the radio wave anomaly detection system 103 includes both the learning process function and the determination process function. However, there is no limitation thereto. This system may only include the determination process function, as with the configuration shown in FIG. 10.

In this example embodiment, the example where the feature re-obtaining unit 30 re-obtains the feature using a plurality of the first features extracted by the feature extraction unit 20 and thus generates the second feature, is used and described. However, there is no limitation thereto. The feature re-obtaining unit 30 may extract the second feature directly from the received data only if this unit can generate the similar second feature. Furthermore, in this example embodiment, the example of detecting continuous occurrence of interference with low power using the second feature is used and described. It is a matter of course that irrespective of the magnitude of the power, continuous occurrence of interference can be detected.

Third Example Embodiment

Figure 15:
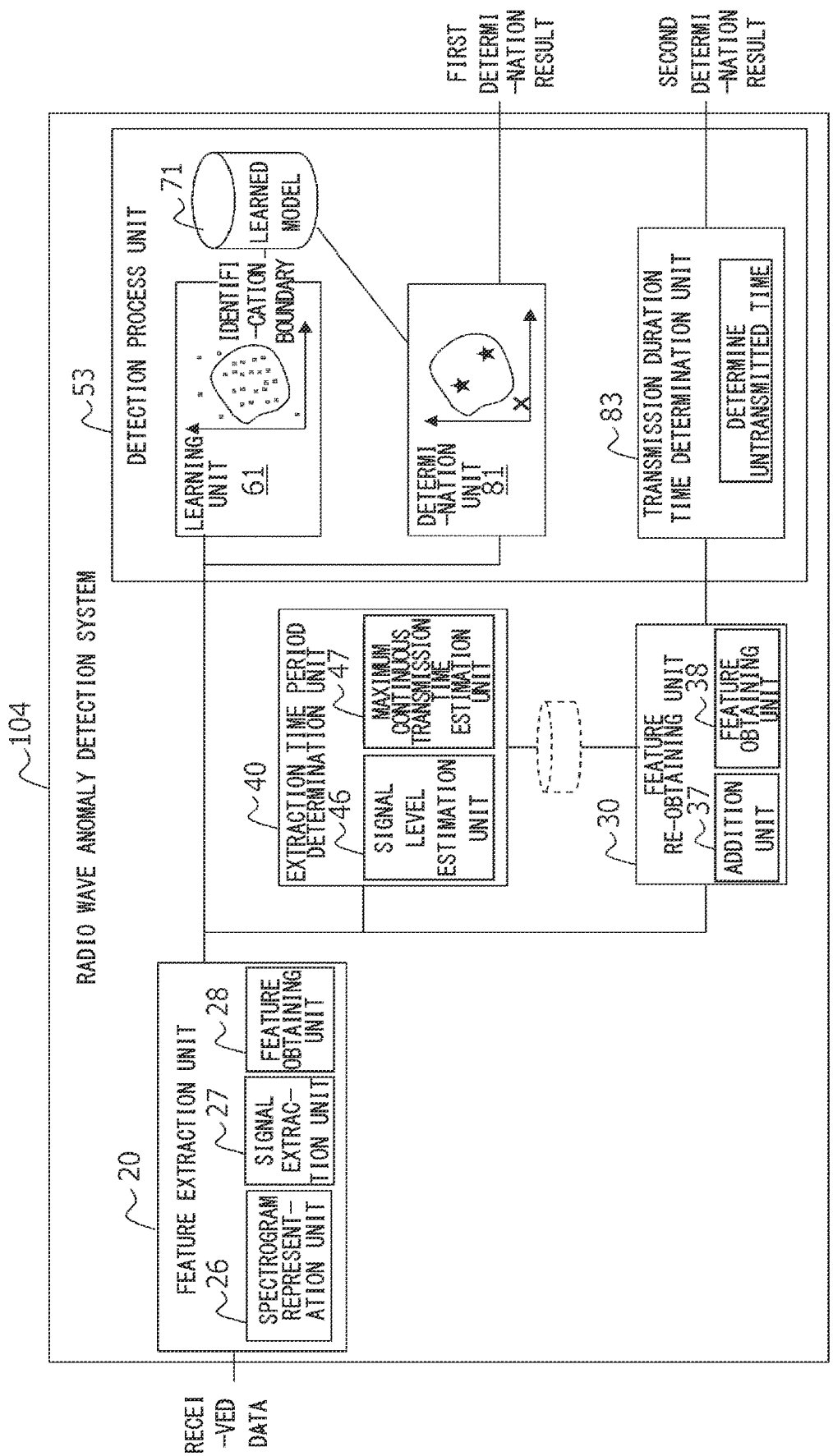
FIG. 15 is a block diagram showing an overall configuration of a radio wave anomaly detection system according to a third example embodiment.

FIG. 15 is a block diagram showing an example of configuration of a radio wave anomaly detection system 104 according to a third example embodiment. In the radio wave anomaly detection system 104, the detection process unit does not have a function of learning a model using the second features, which are long-term features. In the radio wave anomaly detection system 104, the detection process unit includes a function of determining whether the received data includes a radio wave anomaly or not through comparison between the maximum continuous transmission time estimated in the learning process and the transmission duration time of the transmitted signal included in the received data, instead of the function of determining whether the received data includes a radio wave anomaly or not using the second features.

Note that in the radio wave anomaly detection system 104, part of each of processes that are the learning process and the determination process is achieved using a common processing circuit. However, the learning process and the determination process may be achieved using processing circuits different from each other.

The radio wave anomaly detection system 103 at least includes, for example: a feature extraction unit 20 of extracting a first feature that is a short-term feature; a feature re-obtaining unit (second feature extraction unit) 30 of extracting a second feature that is a long-term feature by re-obtaining a feature using a plurality of the first features extracted by the feature extraction unit 20; an extraction time period determination unit 40 of determining the extraction time period of the second feature by the feature re-obtaining unit 30; and a detection process unit (anomaly detection unit) 53 of learning a model representing presence or absence of a radio wave anomaly in received data, and determining presence or absence of a radio wave anomaly in the received data.

Here, the configurations of the feature extraction unit 20, the feature re-obtaining unit 30, and the extraction time period determination unit 40 are similar to the feature extraction unit 20, feature re-obtaining unit 30, and the extraction time period determination unit 40 provided for the radio wave anomaly detection system 100. Accordingly, the description is omitted. Note that the maximum continuous transmission time (extraction time period T2) estimated by the extraction time period determination unit 40 in the learning process is used by the feature re-obtaining unit 30 and a transmission duration time determination unit 83, described later, in the determination process. Hereinafter, the detection process unit 53 is mainly described.

The detection process unit 53 includes the learning unit 61, the database 71, the determination unit 81, and the transmission duration time determination unit 83.

The learning unit 61 performs machine learning of a mode representing whether the received data includes a radio wave anomaly or not using a plurality of the first features extracted by the feature extraction unit 20 in the learning process. The database 71 stores a learned model (hereinafter, also called a learned model 71) generated by the machine learning by the learning unit 61. In the determination process, the determination unit 81 determines whether the received data includes a radio wave anomaly or not, using the first and second features extracted from the received data, and the learned model 71, in the determination process. The determination result of the determination unit 81 is output, as the first determination result, from the detection process unit 53.

The transmission duration time determination unit 83 performs a comparison determination between the maximum continuous transmission time (extraction time period T2) estimated by the extraction time period determination unit 40, and the transmission duration times of individual transmitted signals obtained from a plurality of the second features extracted by the feature re-obtaining unit 30. Besides the first determination result, the determination result of the transmission duration time determination unit 83 is output, as the second determination result, from the detection process unit 53.

(Operation of Radio Wave Anomaly Detection System 104)

Subsequently, the operation of the radio wave anomaly detection system 104 according to the third example embodiment is described.

Figure 16:
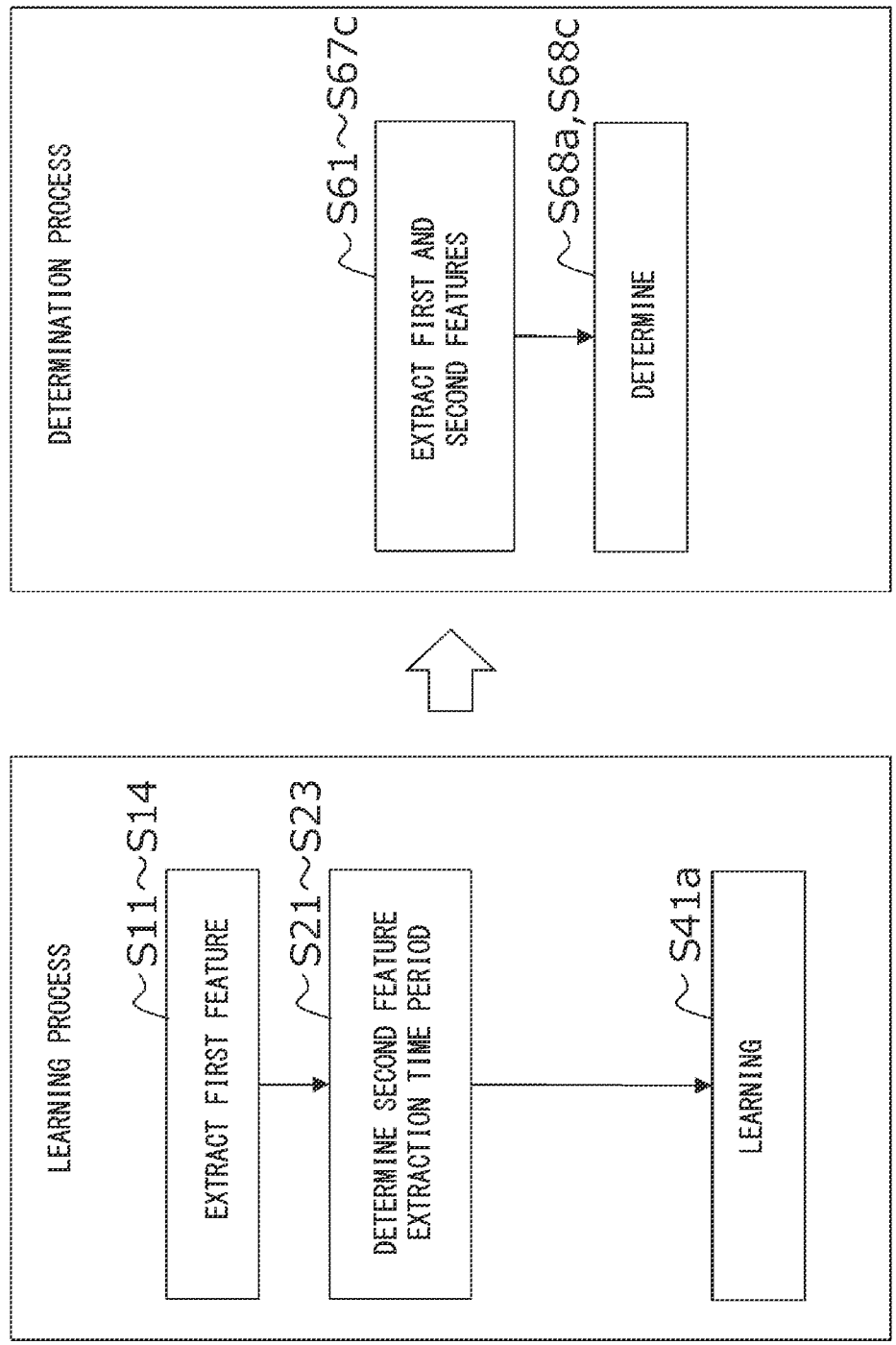
FIG. 16 is a flowchart showing an overview of a flow of overall processes through the radio wave anomaly detection system according to the third example embodiment.

FIG. 16 is a flowchart showing an overview of a flow of overall processes through the radio wave anomaly detection system 104. Note that the flow of overall processes by the radio wave anomaly detection system 104 is mainly similar to the flow of overall processes by the radio wave anomaly detection system 100 shown in FIG. 3. Note that in the learning process, the processes (steps S31 to S33) of extracting the second feature by the feature re-obtaining unit 30 may be omitted.

Specifically, the processes by the radio wave anomaly detection system 100 are classified into steps of learning processes to be preliminarily or periodically performed, and steps of determination processes to be sequentially performed during operation. The learning process mainly includes: processes of extracting a first feature that is a short-term feature (steps S11 to S14); processes of determining an extraction time period for extracting a second feature that is a long-term feature (steps S21 to S23); and a learning process (step S41*a*). The determination process mainly includes a process of sequentially extracting the first features and the second features (steps S61 to S66 and S67*c*); and a process of determining whether the received data includes a radio wave anomaly or not (step S68*a* and S68*c*).

(Details of Learning Processes by Radio Wave Anomaly Detection System 104)

Figure 17A:
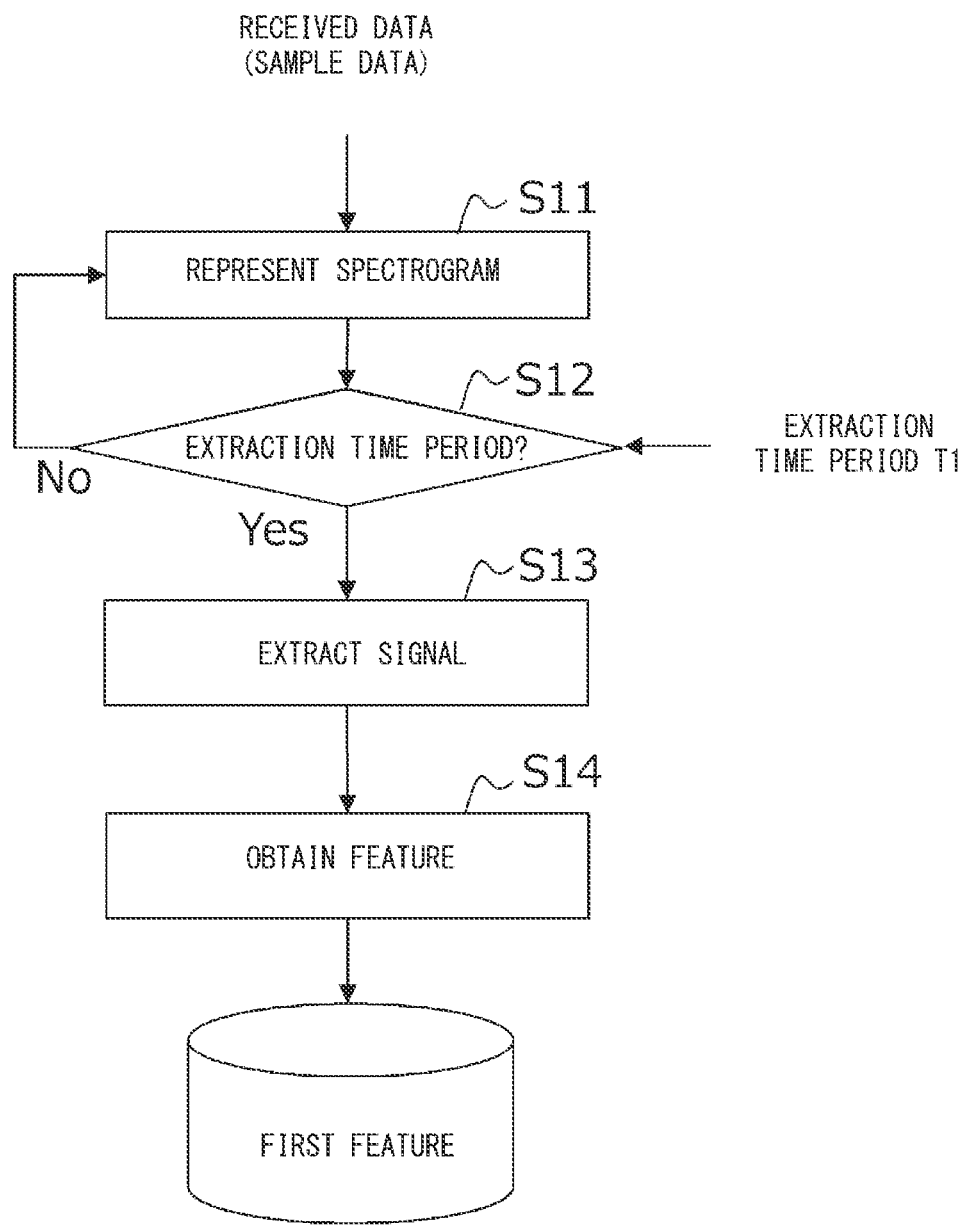
FIG. 17A is a flowchart showing a flow of a learning process through the radio wave anomaly detection system according to the third example embodiment.
Figure 17B:
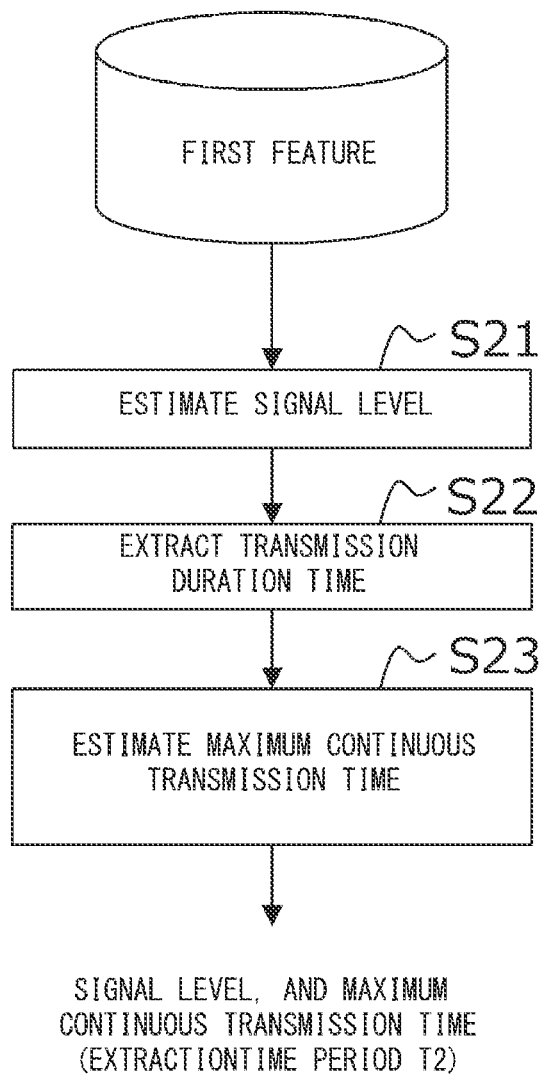
FIG. 17B is a flowchart showing a flow of the learning process through the radio wave anomaly detection system according to the third example embodiment.
Figure 17C:
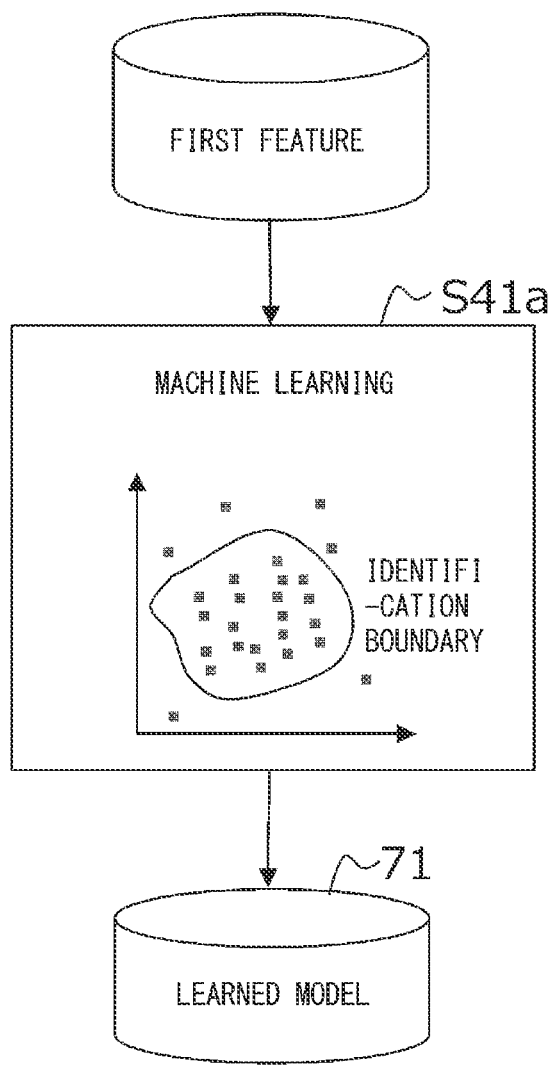
FIG. 17C is a flowchart showing a flow of the learning process through the radio wave anomaly detection system according to the third example embodiment.

FIGS. 17A to 17C are flowcharts showing flows of the learning processes through the radio wave anomaly detection system 104 according to the third example embodiment.

It is assumed that the learning processes shown in FIGS. 17A to 17C collect received data in a normal state (at the normal time), as sample data. Among the learning processes, the process of extracting the first feature through the feature extraction unit 20, and the process of determining the extraction time period T2 for the second feature through the extraction time period determination unit 40 are similar to those in the case of the radio wave anomaly detection system 100. Accordingly, the description thereof is omitted. Note that in the learning process, the signal level and the maximum continuous transmission time (extraction time period T2) estimated by the extraction time period determination unit 40 in the learning process are used by the feature re-obtaining unit 30 and a transmission duration time determination unit 83, described later, in the determination process.

Hereinafter, among the learning processes, the machine learning process (steps S41*a*) characteristic in the radio wave anomaly detection system 104 is described.

The learning unit 61 performs machine learning of a model representing whether the received data includes a radio wave anomaly (radio interference and failure) or not using feature vectors that high-dimensionally (multi-dimensionally) represent first features extracted every short-term extraction time period T1 (step S41*a*).

This example embodiment assumes a case where the machine learning adopted by the learning units 61 is unsupervised learning in order to detect unknown interference and failure that are difficult to be preliminarily defined as training data, and assumes a case of one-class SVM, for example. Note that the machine learning adopted by the learning unit 61 is not limited to one-class SVM. For example, machine learning of a model, such as an anomaly detection model using deep learning and the like (Deep Anomaly Detection), may be adopted. Alternatively, the machine learning adopted by the learning unit 61 may use a method of learning a threshold for statistically detecting an anomaly using the Mahalanobis distance, variance (standard deviation) and the like, from the distribution of the high-dimensional (multi-dimensional) feature vectors as described above, and a method of predicting the change tendency using a state filter, such as a Kalman filter or a particle filter, and detecting whether to deviate from the change tendency or not, with no problem. Furthermore, the machine learning adopted by the learning unit 61 is not limited to the unsupervised learning, and may be supervised learning instead.

The learned model, the threshold for detecting an anomaly, the coefficient indicating the change tendency and the like generated by the machine learning by the learning unit 61 are stored in the database 71.

Note that according to this example embodiment, in the learning process, the process of machine learning using the second features is omitted. According to this example embodiment, in the determination process, the signal level and the maximum continuous transmission time estimated by the extraction time period determination unit 40 are used instead of the learned model subjected to machine learning using the second features.

(Details of Determination Process by Radio Wave Anomaly Detection System 104)

Figure 18:
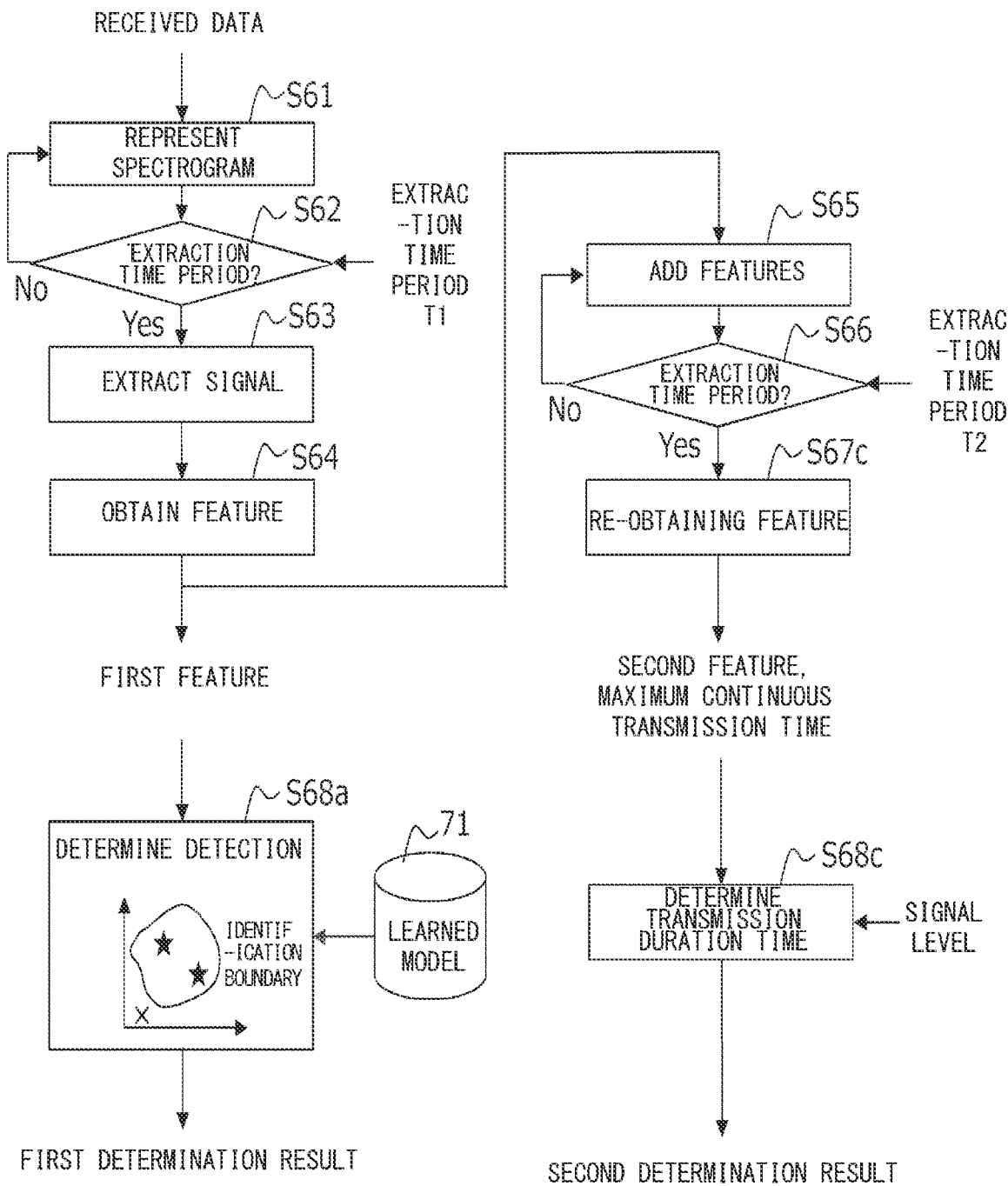
FIG. 18 is a flowchart showing a flow of a determination process through the radio wave anomaly detection system according to the third example embodiment.

FIG. 18 is a flowchart showing a flow of a determination process through the radio wave anomaly detection system 104 according to the third example embodiment.

The determination process shown in FIG. 18 is a process of obtaining received data from a radio wave environment to be monitored at the time of actual operation, and sequentially performing the detection determination of radio interference and failure. Note that among the determination processes, the process of extracting the first feature through the feature extraction unit 20, and the process of extracting the second feature through the feature re-obtaining unit 30 are similar to those in the case of the radio wave anomaly detection system 100. Accordingly, the description thereof is omitted.

Note that the second features extracted by the feature re-obtaining unit 30 are only required to include information required to estimate the transmission duration time of the transmitted signal by the transmission duration time determination unit 83. Accordingly, for example, similar to the case in the first example embodiment, the features may be various statistical features as shown in FIGS. 6A to 6D, and may be what includes only information on presence or absence of the untransmitted time slot (the distribution of the reception levels having noise levels less than the signal level) in every extraction time period T2. Alternatively, the second features may be what includes the information on the first features as they are.

Hereinafter, among the determination processes, the detection determination process (steps S68a and S68c) characteristic in the radio wave anomaly detection system 104 is described.

First, the determination unit 81 performs a first detection determination process, using the first features sequentially extracted from the received data, and the learned model 71 generated by the machine learning by the learning unit 61 in the learning process (step S68a).

For example, in a case where the learned model 71 has been generated by machine learning, such as one-class SVM, which is a type of unsupervised learning, the determination unit 81 receives the feature vectors high-dimensionally (multi-dimensionally) representing the first features, then converts the positional relationship and the distances of the feature vectors for an identification boundary constructed in the learned model 71, into normality (or abnormality), and outputs this. The determination unit 81 then outputs a first determination result of whether the received data includes a radio wave anomaly or not, based on the calculation result.

Note that in cases of statistically detecting an anomaly using the Mahalanobis distance, variance (standard deviation) and the like, the determination unit 81 may calculate the distances of the feature vectors from a learned threshold having been learned in the learning process, and output the distances as a determination result. Alternatively, in cases of predicting the change tendency using a state filter, such as a Kalman filter or a particle filter, the determination unit 81 may calculate the deviation degrees of the feature vectors from a coefficient indicating the change tendency, and output the degrees as a determination result.

The transmission duration time determination unit 83 performs a process of determining the transmission duration time of each transmitted signal included in the received data, based on the second feature extracted every long-term extraction time period T2, and information on the signal level and the maximum continuous transmission time estimated by the extraction time period determination unit 40 in the learning process (step S68C).

Here, in a case where the feature re-obtaining unit 30 extracts the second feature every long-term extraction time period T2 similar to the case of the first example embodiment, the transmission duration time determination unit 83 is only required to detect presence or absence of the untransmitted time slot (the distribution of the reception levels having the noise levels less than the signal level) in the second feature in the extraction time period T2. For example, in a case where an untransmitted time slot exists, the transmission duration time determination unit 83 outputs a determination result representing "normality" (a determination result representing that the received data includes no radio wave anomaly). In a case where no untransmitted time slot exists, this unit outputs a determination result representing "anomaly" (a determination result representing that the received data includes a radio wave anomaly).

Alternatively, the transmission duration time determination unit 83 may extract, as the transmission duration time of the transmitted signal, a time after switching from the feature having a untransmitted time slot to the feature having no untransmitted time slot until the feature is switched to the feature having an untransmitted time slot again, using at least any of the first and second features, compares the transmission duration time of the transmitted signal with the maximum continuous transmission time estimated by the extraction time period determination unit 40, and transmit the comparison result thereof. For example, if the transmission duration time of the transmitted signal does not exceed the maximum continuous transmission time, the transmission duration time determination unit 83 outputs a determination result representing "normality". If the duration time exceeds maximum continuous transmission time, this unit outputs a determination result representing "anomaly". Note that in a case where the feature re-obtaining unit 30 has already performed the detection determination process of presence or absence of the untransmitted time slot and only the determination result is input into the transmission duration time determination unit 83, this transmission duration time determination unit 83 may output the determination result representing "normality" based on the determination result if the untransmitted time slot exists, for example, and output a determination result representing "anomaly" if no untransmitted time slot exists.

Besides the first determination result by the first determination unit 81, the determination result of the transmission duration time determination unit 83 is output, as the second determination result, from the detection process unit 53.

As described above, the radio wave anomaly detection system 104 according to this example embodiment can exert advantageous effects equivalent to those of the radio wave anomaly detection system 100. The radio wave anomaly detection system 104 performs the process of learning and determination using the first feature extracted every short-term extraction time period T1, and compares the maximum continuous transmission time determined in the learning process with the transmission duration time of the transmitted signal obtained from the second feature, with respect to the second feature extracted every long-term extraction time period T2, without any need of learning, and determines whether the received data includes a radio wave anomaly or not. Accordingly, similar to the case of the radio wave anomaly detection system 103, the radio wave anomaly detection system 104 can separately output the first determination result of the determination process using the first features, which are the short-term features, and the second determination result of the determination process using the second features, which are the long-term features. Accordingly, for example, the user can more correctly identify the factors and states of radio interference and failure from the combination of the first and second determination results.

Furthermore, the radio wave anomaly detection system 104 according to this example embodiment is not required to perform machine learning using the second features, which are long-term features. Accordingly, in comparison with the case of the radio wave anomaly detection system 103, the entire system can be simplified and improved in efficiency. For example, this leads to the advantageous effects of reducing the circuit scale and learning time. The second determination process using the second feature, which is the long-term feature, can definitely determine the factor of the anomaly in case of determination of an anomaly as "anomaly caused by the transmission duration time". Note that the interference and failure detectable using the second feature in each long-term extraction time period T2 in the radio wave anomaly detection system 103 according to the second example embodiment are possibly undetectable in the radio wave anomaly detection system 104 according to the third example embodiment. Accordingly, it is conceivable that there is a tradeoff between the detection performance and the improvement in efficiency.

Note that in this example embodiment, the case has been described where the radio wave anomaly detection system 104 includes both the learning process function and the determination process function. However, there is no limitation thereto. This system may only include the determination process, as with the configuration shown in FIG. 10.

In this example embodiment, the example where the feature re-obtaining unit 30 re-obtains the feature using a plurality of the first features extracted by the feature extraction unit 20 and thus generates the second feature, is used and described. However, there is no limitation thereto. The feature re-obtaining unit 30 may extract the second feature directly from the received data only if this unit can generate the similar second feature. Furthermore, in this example embodiment, the example of detecting continuous occurrence of interference with low power using the second feature is used and described. It is a matter of course that irrespective of the magnitude of the power, continuous occurrence of interference can be detected.

As described above, the radio wave anomaly detection system according to the present disclosure can exert advantageous effects as follows.

First, the radio wave anomaly detection system according to the present disclosure causes the detection process unit to perform learning and detection, using both the first feature extracted every short-term extraction time period T1 through the feature extraction unit, and the second feature extracted every long-term extraction time period T2 through the feature re-obtaining unit. Here, in the radio wave anomaly detection system according to the present disclosure, the extraction time period determination unit estimates the maximum continuous transmission time in the normal state, and determines the long-term extraction time period T2 in conformity with the maximum continuous transmission time. Accordingly, the radio wave anomaly detection system according to the present disclosure can apply learning and determination using not only the first features but also the second features to "the received data accompanied by continuous occurrence of interference with low power" incapable of being determined to be "abnormal" by the determination process using only the first features that are short-term features, thereby allowing determination of "anomaly" as expected.

The radio wave anomaly detection system according to the present disclosure performs the determination process of whether the received data includes a radio wave anomaly or not, using the learned model generated by unsupervised learning. Accordingly, for example, unknown radio interference and failure that have a low reception level and are not included in the training data can also be detected.

The radio wave anomaly detection system according to the present disclosure separately executes the process of performing learning and determination using the first feature extracted every short-term extraction time period T1, and the process of performing learning and determination using the second feature extracted every long-term extraction time period T2. Accordingly, the first determination result of the determination process using the first features, which are short-term features, and the second determination result of the determination process using the second features, which are long-term features, can be separately output. Accordingly, for example, the user can correctly identify the factor and state of radio interference and failure from the combination between the first and second determination results.

For example, when both the first and second determination results are normal, the user can determine that the received data includes no radio wave anomaly. When the first determination result is abnormal and the second determination result is normal, it can be estimated that "interference and failure having large variation instantaneously occur". When the first determination result is normal and the second determination result is abnormal, it can be estimated that "interference and failure having small variation are continuously occurring". Furthermore, when both the first and second determination results are abnormal, it can be estimated that "interference and failure having large variation even in instantaneous view are continuously occurring".

The radio wave anomaly detection system according to the present disclosure generates the second feature by re-obtaining the feature every long-term extraction time period through the feature re-obtaining unit, based on a plurality of the first features, which are the short-term features, extracted through the feature extraction unit. Accordingly, in comparison with the case where the first and second feature extraction unit are provided in parallel, the processes of spectrogram representation (spectrum representation) in the frequency-axis direction, and extracting the reception levels by time-by-time basis and generating the frequency distribution can be commonalized. Accordingly, the feature re-obtaining unit can achieve extraction of the second feature only by addition of the frequencies. The FFT process for spectrogram representation (spectrum representation and frequency transformation), and the process of creating the frequency distribution are more complicated processes than addition. Accordingly, it is expected that commonalization of the processes improve efficiency and simplification of the system configuration.

Furthermore, the radio wave anomaly detection system according to the present disclosure does not perform the determination process using the learned model as the determination process using the second feature extracted every long-term extraction time period T2, but determines whether the received data includes a radio wave anomaly or not by comparing the maximum continuous transmission time determined in the learning process with the transmission duration time of the transmitted signal obtained from the second features, thereby negating the need of the learning unit for performing machine learning using the second features, and the learned model. Consequently, the entire system can be simplified and improved in efficiency. For example, this leads to the advantageous effects of reducing the circuit scale and learning time.

The example embodiments of the present disclosure have thus been described with reference to the drawings. However, the specific configuration is not limited to what are described above. Various design changes can be performed in a scope without deviating from the gist of the present disclosure. The details described in the example embodiments may be combined and used.

The aforementioned example embodiments have thus been described as the hardware configuration. However, the present disclosure is not limited thereto. According to the present disclosure, the control processes through the radio wave anomaly detection system can also be achieved by causing a central processing unit (CPU) to execute a computer program.

The program described above includes the instructions (or software code) for causing the computer to perform the one or more functions described in the example embodiments after being read by the computer. The program may be stored in a non-transitory computer readable medium, or a tangible storing medium. Without limitation but as an example, the computer-readable medium, or a tangible storing medium encompasses a random-access memory (RAM), a read-only memory (ROM), flash memories, a solid-state drive (SSD) or other memory technologies, a CD-ROM, a digital versatile disc (DVD), and Blu-ray® disks or other optical disk storage, and a magnetic cassette, magnetic tape, a magnetic disk storage, or another magnetic storage device. The program may be transmitted in a non-transitory computer readable medium, or a communication medium. Without limitation but as an example, the transitory computer readable medium, or a communication medium encompasses propagation signals, such as an electric, optical, audio, or other format.

According to the example embodiment described above, the radio wave anomaly detection system, the radio wave anomaly detection method, and the radio wave anomaly detection program that are capable of accurately detect a radio wave anomaly included in the received data can be provided.

The first to third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A radio wave anomaly detection system comprising:
   at least one memory storing program instructions; and
   at least one processor configured to execute the instructions stored in the memory to:
   output a detection result about a radio wave anomaly that is included in received data and has been detected using a first feature that is a feature extracted from the received data every first predetermined time period, and a second feature that is a feature extracted from the received data every second predetermined time period longer than the first predetermined time period, wherein
   the first feature is statistical information including information about the received data on both a frequency direction and a time direction in the first predetermined time period, and
   the second feature is statistical information including information about the received data on both the frequency direction and the time direction in the second predetermined time period.

2. The radio wave anomaly detection system according to claim 1, wherein
   the at least one processor is configured to output a detection result about a first radio wave anomaly that is part of the radio wave anomaly included in the received data and has been detected using the first feature extracted from the received data every first predetermined time period, and output a detection result about a second radio wave anomaly that is another part of the radio wave anomaly included in the received data and has been detected using the second feature extracted from the received data every second predetermined time period.

3. The radio wave anomaly detection system according to claim 1, wherein
   the at least one processor is configured to extract a feature in the received data in every first predetermined time period, as the first feature,
   extract a feature in the received data in every second predetermined time period longer than the first predetermined time period, as the second feature, and
   detect the radio wave anomaly included in the received data, using the first feature and the second feature.

4. The radio wave anomaly detection system according to claim 3, wherein
   in extraction of the second feature, the at least one processor is configured to extract the second feature in every second predetermined time period, by totalizing a plurality of the first features in the corresponding second predetermined time period.

5. The radio wave anomaly detection system according to claim 3, wherein
   the at least one processor is configured to estimate a maximum continuous transmission time of the transmitted signal included in the received data, from a plurality of the extracted first features, and
   determine the second predetermined time period in conformity with the estimated maximum continuous transmission time.

6. The radio wave anomaly detection system according to claim 5, wherein
   in estimation of the maximum continuous transmission time,
   the at least one processor is configured to estimate a signal level of the transmitted signal included in the received data, from the plurality of extracted first features, and estimate the maximum continuous transmission time that is a maximum value of times in which the signal level is maintained, based on a situation of occurrence of the signal level in each of the plurality of first features.

7. The radio wave anomaly detection system according to claim 5, wherein
in detection of the radio wave anomaly included in the received data,
the at least one processor is configured to detect the first radio wave anomaly that is part of the radio wave anomaly included in the received data, using the first feature, and
detect a second radio wave anomaly that is another part of the radio wave anomaly included in the received data, by comparison between a transmission duration time that is of the transmitted signal included in the received data and is detected from the second feature, and the maximum continuous transmission time.

8. The radio wave anomaly detection system according to claim 3, wherein
in detection of the radio wave anomaly included in the received data,
the at least one processor is configured to detect the first radio wave anomaly that is part of the radio wave anomaly included in the received data, using the first feature, and
detect a second radio wave anomaly that is another part of the radio wave anomaly included in the received data, using the second feature.

9. The radio wave anomaly detection system according to claim 3, wherein
the at least one processor is configured to extract a feature of sample data in every first predetermined time period, as a first sample feature,
extract a feature of the sample data in every second predetermined time period, as a second sample feature, and
perform machine learning of a model representing whether the received data includes a radio wave anomaly or not using a plurality of the extracted first sample features and a plurality of the extracted second sample features, and
in detection of the radio wave anomaly included in the received data, the at least one processor is configured to detect the radio wave anomaly included in the received data, based on a plurality of the first features, a plurality of the second features, and a learned model generated by the machine learning.

10. A radio wave anomaly detection method performed by a computer and comprising:
extracting a feature in received data in every first predetermined time period, as a first feature;
extracting a feature in the received data in every second predetermined time period longer than the first predetermined time period, as a second feature; and
detecting a radio wave anomaly included in the received data, using the first feature and the second feature, wherein
the first feature is statistical information including information about the received data on both a frequency direction and a time direction in the first predetermined time period, and
the second feature is statistical information including information about the received data on both the frequency direction and the time direction in the second predetermined time period.

11. The radio wave anomaly detection method according to claim 10, wherein
in detection of the radio wave anomaly included in the received data,
the method detects a first radio wave anomaly that is part of the radio wave anomaly included in the received data, using the first feature extracted every first predetermined time period from the received data, and
detects a second radio wave anomaly that is another part of the radio wave anomaly included in the received data, using the second feature extracted every second predetermined time period from the received data.

12. The radio wave anomaly detection method according to claim 10, wherein in extraction of the second feature, the method extracts the second feature in every second predetermined time period, by totalizing a plurality of the first features in the corresponding second predetermined time period.

13. The radio wave anomaly detection method according to claim 10, wherein
the method estimates a maximum continuous transmission time of the transmitted signal included in the received data, from a plurality of the extracted first features, and
determines the second predetermined time period in conformity with the estimated maximum continuous transmission time.

14. The radio wave anomaly detection method according to claim 13, wherein
in estimation of the maximum continuous transmission time,
the method estimates a signal level of the transmitted signal included in the received data, from the plurality of extracted first features, and
estimates the maximum continuous transmission time that is a maximum value of times in which the signal level is maintained, based on a situation of occurrence of the signal level in each of the plurality of first features.

15. The radio wave anomaly detection method according to claim 13, wherein
in detection of the radio wave anomaly included in the received data,
the method detects the first radio wave anomaly that is part of the radio wave anomaly included in the received data, using the first feature, and
detects a second radio wave anomaly that is another part of the radio wave anomaly included in the received data, by comparison between a transmission duration time that is of the transmitted signal included in the received data and is detected from the second feature, and the maximum continuous transmission time.

16. The radio wave anomaly detection method according to claim 10, wherein
the method extracts a feature of sample data in every first predetermined time period, as a first sample feature,
extracts a feature of the sample data in every second predetermined time period, as a second sample feature, and
performs machine learning of a model representing whether the received data includes a radio wave anomaly or not using a plurality of the extracted first sample features and a plurality of the extracted second sample features, and
in detection of the radio wave anomaly included in the received data, the method detects the radio wave anomaly included in the received data, based on a plurality of the first features, a plurality of the second features, and a learned model generated by the machine learning.

17. A non-transitory computer readable medium storing a radio wave anomaly detection program causing a computer to execute:
- a first feature extracting process of extracting a feature in received data in every first predetermined time period, as a first feature;
- a second feature extracting process of extracting a feature in the received data in every second predetermined time period longer than the first predetermined time period, as a second feature; and
- an anomaly detection process of detecting a radio wave anomaly included in the received data, using the first feature and the second feature, wherein
- the first feature is statistical information including information about the received data on both a frequency direction and a time direction in the first predetermined time period, and
- the second feature is statistical information including information about the received data on both the frequency direction and the time direction in the second predetermined time period.

* * * * *